(12) United States Patent
Paolini-Subramanya

(10) Patent No.: US 10,868,917 B2
(45) Date of Patent: *Dec. 15, 2020

(54) PHONE SYSTEMS AND METHODS OF COMMUNICATION

(71) Applicant: Ubiquiti Inc., New York, NY (US)

(72) Inventor: Mahesh Paolini-Subramanya, Austin, TX (US)

(73) Assignee: Ubiquiti Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/521,452

(22) Filed: Jul. 24, 2019

(65) Prior Publication Data

US 2019/0349479 A1 Nov. 14, 2019

Related U.S. Application Data

(63) Continuation of application No. 15/495,688, filed on Apr. 24, 2017, now Pat. No. 10,425,536, which is a continuation-in-part of application No. 14/708,077, filed on May 8, 2015, now abandoned.

(60) Provisional application No. 61/990,322, filed on May 8, 2014.

(51) Int. Cl.
| | | |
|---|---|---|
| *H04M 3/56* | (2006.01) |
| *H04M 7/00* | (2006.01) |
| *H04L 12/10* | (2006.01) |
| *H04M 3/54* | (2006.01) |
| *H04M 1/253* | (2006.01) |
| *H04M 1/04* | (2006.01) |

(52) U.S. Cl.
CPC .............. *H04M 3/56* (2013.01); *H04L 12/10* (2013.01); *H04M 1/2535* (2013.01); *H04M 3/54* (2013.01); *H04M 7/006* (2013.01); *H04M 7/0066* (2013.01); *H04M 1/04* (2013.01); *H04M 1/72513* (2013.01); *H04M 2201/42* (2013.01); *H04M 2250/62* (2013.01)

(58) Field of Classification Search
None
See application file for complete search history.

(56) References Cited

U.S. PATENT DOCUMENTS

| | | |
|---|---|---|
| 5,131,006 A | 7/1992 | Kamerman et al. |
| 5,151,920 A | 9/1992 | Haagh et al. |
| 5,295,154 A | 3/1994 | Meier et al. |
| 5,406,260 A | 4/1995 | Cummings et al. |
| 5,422,887 A | 6/1995 | Diepstraten et al. |
| 5,428,636 A | 6/1995 | Meier |
| 5,504,746 A | 4/1996 | Meier |

(Continued)

FOREIGN PATENT DOCUMENTS

| | | |
|---|---|---|
| CN | 102111503 A | 6/2011 |
| CN | 102223363 A | 10/2011 |

(Continued)

*Primary Examiner* — Jamaal Henson
(74) *Attorney, Agent, or Firm* — Shay Glenn LLP

(57) ABSTRACT

Phone systems, phone devices (including hardware, software and firmware), and methods of operating a phone. Described herein are dissociated phone systems including one or a plurality of local client phones with basic call handling capability that communicate though a remote phone server but are locally controlled by a controller gateway that manages the local network including the local client phones.

20 Claims, 20 Drawing Sheets

(56) References Cited

U.S. PATENT DOCUMENTS

| | | | |
|---|---|---|---|
| 5,546,397 A | 8/1996 | Mahany | |
| 5,706,428 A | 1/1998 | Boer et al. | |
| 5,740,366 A | 4/1998 | Mahany et al. | |
| 5,844,893 A | 12/1998 | Gollnick et al. | |
| 5,936,542 A | 8/1999 | Kleinrock et al. | |
| 5,940,771 A | 8/1999 | Gollnick et al. | |
| 6,020,916 A | 2/2000 | Gerszberg et al. | |
| 6,130,892 A | 10/2000 | Short et al. | |
| 6,194,992 B1 | 2/2001 | Short et al. | |
| 6,337,990 B1 | 1/2002 | Koshino | |
| 6,374,311 B1 | 4/2002 | Mahany et al. | |
| 6,563,786 B1 | 5/2003 | Van Nee | |
| 6,636,894 B1 | 10/2003 | Short et al. | |
| 6,665,536 B1 | 12/2003 | Mahany | |
| 6,697,415 B1 | 2/2004 | Mahany | |
| 6,714,559 B1 | 3/2004 | Meier | |
| 6,760,324 B1* | 7/2004 | Scott | H04L 45/02 370/352 |
| 6,789,110 B1 | 9/2004 | Short et al. | |
| 6,795,852 B1 | 9/2004 | Kleinrock et al. | |
| 6,810,426 B2 | 10/2004 | Mysore et al. | |
| 6,856,616 B1* | 2/2005 | Schuster | H04L 29/06027 370/352 |
| 6,857,009 B1 | 2/2005 | Ferreria et al. | |
| 6,868,399 B1 | 3/2005 | Short et al. | |
| 7,020,082 B2 | 3/2006 | Bhagavath et al. | |
| 7,088,727 B1 | 8/2006 | Short et al. | |
| 7,117,526 B1 | 10/2006 | Short | |
| 7,136,651 B2* | 11/2006 | Kalavade | H04M 3/54 455/445 |
| 7,194,554 B1 | 3/2007 | Short et al. | |
| 7,197,556 B1 | 3/2007 | Short et al. | |
| 7,286,545 B1* | 10/2007 | Tester | H04L 12/66 370/230 |
| 7,295,812 B2 | 11/2007 | Haapoja et al. | |
| 7,298,833 B2* | 11/2007 | Klein | H04M 3/42153 379/201.02 |
| 7,386,002 B2 | 6/2008 | Meier | |
| 7,457,646 B2 | 11/2008 | Mahany et al. | |
| 7,535,890 B2* | 5/2009 | Rojas | H04L 51/04 370/352 |
| 7,660,295 B2* | 2/2010 | Allan | H04M 3/4228 370/352 |
| 7,673,021 B2* | 3/2010 | Tasker | H04L 67/34 709/220 |
| 7,739,383 B1 | 6/2010 | Short et al. | |
| 7,752,334 B2 | 7/2010 | Paunikar et al. | |
| 7,826,426 B1 | 11/2010 | Bharghavan et al. | |
| 7,953,832 B2* | 5/2011 | Richard | H04L 61/106 709/222 |
| 8,077,113 B2 | 12/2011 | Syed et al. | |
| 8,098,652 B2* | 1/2012 | Freeman | H04L 67/125 370/352 |
| 8,190,708 B1 | 5/2012 | Short et al. | |
| 8,335,272 B2 | 12/2012 | Roberts | |
| 8,483,188 B2 | 7/2013 | Walton et al. | |
| 8,483,372 B2* | 7/2013 | Park | H04L 65/1036 379/201.01 |
| 8,489,646 B2 | 7/2013 | Sinha et al. | |
| 8,631,102 B2* | 1/2014 | Raleigh | H04L 41/0806 709/221 |
| 10,425,536 B2 | 9/2019 | Paolini-Subramanya | |
| 2002/0176404 A1* | 11/2002 | Girard | H04M 7/1225 370/352 |
| 2004/0073597 A1* | 4/2004 | Caveney | H04Q 1/03 709/200 |
| 2005/0055202 A1* | 3/2005 | Kunito | H04M 1/60 704/225 |
| 2005/0089052 A1* | 4/2005 | Chen | H04M 1/2535 370/401 |
| 2005/0099999 A1* | 5/2005 | Phillips | H04M 3/432 370/352 |
| 2005/0141431 A1* | 6/2005 | Caveney | H04L 41/00 370/241 |
| 2005/0180403 A1* | 8/2005 | Haddad | H04M 3/42229 370/352 |
| 2005/0207432 A1* | 9/2005 | Velez-Rivera | H04M 3/493 370/401 |
| 2005/0213567 A1* | 9/2005 | Mullins | H04M 3/22 370/352 |
| 2006/0047800 A1* | 3/2006 | Caveney | H04L 41/00 709/223 |
| 2006/0199612 A1 | 9/2006 | Beyer et al. | |
| 2006/0205436 A1* | 9/2006 | Liu | H04M 3/42314 455/560 |
| 2006/0291450 A1* | 12/2006 | Ramachandran | H04L 65/1046 370/352 |
| 2007/0115935 A1* | 5/2007 | Qiu | H04L 41/12 370/352 |
| 2007/0171098 A1* | 7/2007 | Basart | H04M 1/2535 341/22 |
| 2007/0280464 A1* | 12/2007 | Hughes | H04M 7/003 379/205.01 |
| 2008/0080703 A1 | 4/2008 | Penning et al. | |
| 2008/0084870 A1* | 4/2008 | Taylor | H04L 67/34 370/352 |
| 2008/0104524 A1 | 5/2008 | Van Hammond et al. | |
| 2008/0113560 A1* | 5/2008 | Caveney | H04L 43/50 439/676 |
| 2008/0126351 A1* | 5/2008 | Freeman | H04L 29/12216 |
| 2008/0168283 A1* | 7/2008 | Penning | G06F 1/263 713/310 |
| 2008/0316939 A1* | 12/2008 | Shimamura | H04M 3/42374 370/254 |
| 2009/0041004 A1* | 2/2009 | Emmanuel | H04L 1/1671 370/352 |
| 2009/0128502 A1 | 5/2009 | Li et al. | |
| 2009/0212925 A1* | 8/2009 | Schuman, Sr. | A61B 5/002 340/286.07 |
| 2010/0076135 A1 | 3/2010 | Nielsen et al. | |
| 2010/0087167 A1* | 4/2010 | Tsurutome | H04W 4/50 455/411 |
| 2010/0128641 A1* | 5/2010 | Karnalkar | H04M 3/567 370/261 |
| 2010/0157989 A1* | 6/2010 | Krzyzanowski | G06Q 30/0601 370/352 |
| 2010/0157990 A1 | 6/2010 | Krzyzanowski et al. | |
| 2010/0159898 A1* | 6/2010 | Krzyzanowski | G01D 11/245 455/414.1 |
| 2010/0162153 A1 | 6/2010 | Lau | |
| 2010/0251124 A1 | 9/2010 | Geppert et al. | |
| 2010/0251142 A1 | 9/2010 | Geppert et al. | |
| 2010/0251177 A1 | 9/2010 | Geppert et al. | |
| 2011/0096788 A1* | 4/2011 | Ballard | H04L 29/12301 370/401 |
| 2011/0142215 A1* | 6/2011 | Bi | H04M 3/4878 379/93.23 |
| 2011/0163848 A1* | 7/2011 | Shibata | H04M 3/42263 340/10.1 |
| 2011/0267986 A1* | 11/2011 | Grabelsky | H04Q 3/0025 370/259 |
| 2011/0271210 A1 | 11/2011 | Jones et al. | |
| 2011/0305331 A1* | 12/2011 | Hughes | H04M 7/003 379/202.01 |
| 2012/0036552 A1* | 2/2012 | Dare | H04L 41/0803 726/1 |
| 2012/0046074 A1* | 2/2012 | Gittleman | H04M 1/72527 455/557 |
| 2012/0076135 A1* | 3/2012 | Freeman | H04M 3/42178 370/352 |
| 2012/0155445 A1 | 6/2012 | Javaregowda et al. | |
| 2012/0314852 A1* | 12/2012 | Suri | H04M 7/0015 379/114.01 |
| 2013/0279680 A1 | 10/2013 | Sureka et al. | |
| 2014/0223345 A1 | 8/2014 | Tetali et al. | |
| 2015/0326729 A1* | 11/2015 | Paolini-Subramanya | H04M 3/56 370/260 |

(56) References Cited

U.S. PATENT DOCUMENTS

FOREIGN PATENT DOCUMENTS

| WO | WO98/40990 | A1 | 9/1998 |
| WO | WO01/31855 | A2 | 5/2001 |
| WO | WO01/31886 | A2 | 5/2001 |
| WO | WO01/86877 | A2 | 11/2001 |
| WO | WO2008/042804 | A2 | 4/2008 |
| WO | WO2009/128616 | A2 | 10/2009 |
| WO | WO2011/005710 | A2 | 1/2011 |

* cited by examiner

| Icon | Description |
|---|---|
| | Back: Opens the previous screen you were working in, even if it was in a different app. Once you return to the *Home* screen, you can't go back any further. |
| | Home: Returns to the *Home* screen. |
| | Recent Apps: Displays a list of recently used apps. Press an app to open it. To remove an app from the list, swipe it left or right. |
| | Overflow: Displays additional menu items. |

| Icon | Description |
|---|---|
| | Phone: Toggles the call screen. If you dial a number after pressing the phone button with the handset on the hook, the phone will place a call in speakerphone mode. |
| | Call Log: Displays a list of calls made that are sorted by date and then by time. |
| | Voicemail: Press to access your voicemail. |
| | People: Press to view a list of contacts. To add a contact, click the plus icon in the upper left corner. |
| | Favorites: A list of frequently dialed numbers will appear. |
| | Groups: Displays groups that have been created. |
| | Apps: Press to access the Apps screen. |

FIG. 17A

| Icon | Description |
|---|---|
|  | Phone Displays the keypad to make a call. Recent calls, contacts, and voicemail are also accessible from here. |
|  | Camera Press to access the camera. |
|  | Apps Press to access the *Apps* screen. This default icon is the only one that cannot be removed from the *Home* screen. |
| 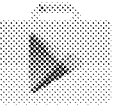 | Google Play™ Store Press to open the Google Play store. Download apps, music, movies, books, games, and other media. A new or existing account is required for access. |
| 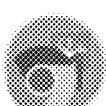 | Google Apps Folder Contains the Google suite of apps including Gmail™, YouTube™, Chrome™, Hangouts™, Google Drive™, Google Maps™, and more. |

FIG. 17B

PHONE SYSTEMS AND METHODS OF COMMUNICATION

CROSS REFERENCE TO RELATED APPLICATIONS

This patent application is a continuation of U.S. patent application Ser. No. 15/495,688, filed on Apr. 24, 2017, titled "PHONE SYSTEMS AND METHODS OF COMMUNICATION", which is a continuation-in-part of U.S. patent application Ser. No. 14/708,077, filed on May 8, 2015, titled "PHONE SYSTEMS AND METHODS OF COMMUNICATION", which claims priority to U.S. Provisional Patent Application No. 61/990,322, filed May 8, 2014, titled "PHONE SYSTEMS AND METHODS OF COMMUNICATION". The entire contents of these applications are herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

This disclosure is related generally to phone systems, phone devices (including hardware, software and firmware), and methods of operating a phone. Also describes are user interfaces for phones and phone systems. In particular, described herein are dissociated phone systems including one or a plurality of local client phones with basic call handling capability that communicate though a remote phone server to handle advanced calling features, including transfers, voicemail, conference calls, call parking, etc.

BACKGROUND

Traditionally type types or classes of phones have been used, "hard" and "soft" phone systems. Hard phone systems imply a physical phone with a dial pad and a handset that resides on the desktop; soft phones systems essentially comprise software that resides on a PC. Initially, so-called "hard" phones such as traditional desktop phones have been used. Hard phones are typically hardwired systems that directly make a call. The hardware (and/or software and firmware) of the desktop phone does all the work of placing and controlling the call. The phone may be directly connected to PSDN (public switch). Originally, power was applied to the phone through the phone line as well. Such hard phone systems typically send commands to the PSDN to make the phone operate. This hard phone model is still in operation today, even with more recent telecommunications devices, such as Ethernet phones. Although these phones may run on an Ethernet connection rather than a twisted pair line, the so-called Ethernet phone may still operate in the same manner, in which the local phone "dials" the number out and controls the call locally. Hard phones are an established technology with a relatively high level of reliability and voice quality, but which may be more expensive, necessarily more complicated, and difficult or at least more involved to service.

In contrast, a "soft" phone system may include telecommunications software such as SKYPE™ that may be configured to operate on virtually any computer (processor) system. Thus, the soft phone may be essentially an application software ("app") that uses a local speaker and microphone and sends commands to a central server that handles and controls the call. Soft phones offer the benefits of relatively low cost and easy installation, with a potentially larger (and easier to maintain/update) set of features, however such systems are notoriously unreliable, and may be more involved to operate, with have an extremely variable sound quality.

Thus, in selecting a phone system to use, a user (or institution) must typically choose between these hard phone and soft phone platforms.

Described herein are telephone systems that may offer many of the advantages of both traditional hard and soft phone platforms, with fewer of the disadvantages. These hybrid phone systems may also offer advantages that neither hard nor soft phones may provide.

Also described herein are phone interface systems and methods of interfacing with one or more users. For example, traditional soft phone and computer user interfaces have allowed the development of 'drag and drop' techniques for handling user and control information. For example, see U.S. Pat. No. 8,489,646 to Abramson et al., which describes drag and drop methods for the importation of content. Abramson describes the use of a drag and drop method between platforms, including for placing calls by dropping information from an address book application into a communications application, or between other address book applications. However, Abramson does not suggest dragging and dropping within a single application to control the call or features of the call.

Described herein are improved phone systems, including methods and apparatus (e.g., systems and devices, such a non-transitory computer-readable storage medium storing a set of instructions capable of being executed by a processor) for making and controlling calls (e.g., telephone calls), including intuitive user interfaces. These methods and apparatus may address the issues raised herein.

SUMMARY OF THE DISCLOSURE

In general, described herein are phone systems (e.g., voice over internet, or VIOP phone systems) that include one or more local phone client portions, which may also be referred to as local phone client devices, and a remote phone server portion. The local phone client portion includes a handset, controls (e.g., touchscreen) for advance call handling (e.g., contacts, conferencing, call forwarding, voicemail, etc.), but it generally not capable of independently performing any of the advanced call handling procedures on calls through the local phone client. Instead, the local phone client instead acts as a simply relay, receiving commands (e.g., via the headset, touchscreen, controls on the body of the device, etc.) and transmitting them, along with audio information from the headset and/or any other built in microphone, to the remote phone server portion. The remote phone server portion may provide the functionality for the local phone client, including connecting the local phone client portion to target phone number, and performing any and all advanced call handling.

In the exemplary apparatuses (e.g., devices and methods) described herein, any of the features or components described in any of the embodiments may be used with any of the features or component in any of the other embodiments.

For example, a phone system may include: a local phone client portion comprising: a body portion including a housing and a handset; a touchscreen coupled to the housing; a processor within the housing, the processor configured to present a user interface comprising user controls on the touchscreen; and an Ethernet connection, wherein the processor is configured to locally perform basic call handling including initiating new phone calls and answering incoming phone calls. The phone system may also include a phone server portion that is remotely located relative to the local phone client portion, the phone server portion configured to operate on calls through the local phone client portion to remotely perform advanced call handling on calls on the local phone client, wherein advanced call handling includes: conferencing calls and placing existing phone calls on hold. In general, the local phone client portion is configured to automatically contact the phone server portion when receiving a call initiated by a user to a third party (e.g., when a user initiates a call to a third party).

In any of these examples, the remote phone server portion may operate in a cloud computing environment. Further, the local phone client portions (devices) may be configured to connect (via a router or switch, either wirelessly or through an Ethernet connection) to the cloud computing environment.

In any of these variations, each individual local phone client portion (device) may be installed and recognized, e.g., by a controller gateway that initiates and allows contact with the remote phone server portion. The controller (and the requirement that the phone be validated by a controller gateway) may allow a controlled local network to be established, and may provide scalable system management of the local phone client portions (devices), including extension management, mass firmware upgrades, and mass configuration provisioning. The controller gateway may allow an administrator having permission to access the controller gateway to monitor the status of each individual local phone client portion (device) on the local network. For example, the controller gateway may display a list of all of the local phone client portions (devices) in a local network and may indicate status (operational status, error status, etc.) for each device, as well as indicating a connectivity map showing how each local phone client portion (device) is connected to the local network of switches/routers, access points, etc. Any of the phone systems described herein may include a controller gateway. The controller gateway may be hardware, software, or both.

Any of the phone systems described herein may include one or more of: a mute button on the handset; a speaker and/or microphone (separate from the headset, which may also include a speaker and microphone) on the body of the local phone client portion (device); a cradle configured to receive a mobile phone; a camera coupled to the local phone client.

Any of the phone systems described herein may include user controls for operating or controlling a call being made on the local phone client portions (devices), including advanced call handling. The local phone client may generally be adapted to transmit requests for advanced call handling from the user controls to the remote phone server so that the remote phone server can remotely provide the advanced call handling.

The local phone client portion typically transmits requests for advanced call handling to the remote phone server so that the remote phone server can remotely provide the advanced call handling. Advanced call handling may include further includes one or more of: call transfers, conferencing (e.g., including conferencing more than three lines), mailbox functions, and the like.

In any of these variations, the local phone client may also be configured to engage with a mobile phone (smartphone). The smartphone may interface with (and communicate through) the local phone client, for example, providing address book information or the like; this information may be passed on to the remote phone server portion.

The remote phone server portion may be configured to operate with a large number of local phone client portions (devices). Thus, when communicating between the local phone client portions and the remote phone server portion, the local phone client portion may be configured to uniquely identify itself.

For example, a phone system may include: a local phone client portion comprising: a processor configured to present a user interface comprising user controls, wherein the processor is configured to locally perform basic call handling including initiating new phone calls and answering incoming phone calls; and a phone server portion that is remotely located relative to the local phone client portion, the phone server portion configured to operate on calls through the local phone client portion to remotely perform advanced call handling on calls on the local phone client, wherein advanced call handling includes: conferencing calls and placing existing phone calls on hold; wherein the local phone client portion is configured to automatically contact the phone server portion when receiving a call initiated by a user to a third party (e.g., when a user initiates a call to a third party).

Also described herein are methods of operating a phone system, the method comprising: initiating a call from a local phone client, wherein the local phone client comprises a handset, a touchscreen, and a processor configured to present a user interface comprising user controls; routing the call from the local phone client through a remote phone server; selecting one or more advanced call handing requests from the user controls on the local phone client; transmitting the request from the local phone client to the remote phone server, whereby the remote phone server is adapted to operate on call to effect the advanced call handling request.

Initiating the call may include transmitting the request for a call from the local phone client to the remote phone server and placing the call by the remote phone server.

Selecting one or more advanced call handling features may include activating a control on the local phone client corresponding to the advanced call handling request (e.g., on a graphical user interface, as mentioned above, and/or from a physical control on the body of the local phone client). As mentioned above, advanced call handling request(s) may include one or more of: conferencing calling, placing a call on hold, voicemail, and transferring a call. Advanced call handling may include conferencing more than 3 participants.

Also described herein are phone systems that include advanced drag-and-drop functionality for controlling calls. Any of these methods may be implemented by a graphical user interface and may be used with any of the phone systems (e.g., controlled by a controller on the local phone client devices and displayed on the touchscreens, etc.) described herein.

For example, a method of placing a phone call on a telecommunications device may include: receiving a touch operation touching a contact icon representing a telephone contact that is displayed on a graphical user interface (GUI) of the telecommunications device; and receiving a drag operation dragging the contact icon onto or near a call icon of the GUI to initiate a phone call to the contact. The GUI may include a contact list section and an available calls section, wherein the contact icon is displayed within the contact list section and the call icon is displayed within the available calls section.

A method of transferring a phone call on a telecommunications device may include: receiving a touch operation touching a call icon that is displayed on a graphical user interface (GUI) of the telecommunications device, wherein the call icon represents a phone connection between a user of the telecommunications device and a first contact; and receiving a drag operation dragging the call icon onto or near a contact icon of the GUI to transfer the phone connection between the first contact and a second contact represented by the contact icon.

A method of initiating a conference call on a telecommunications device may include: receiving an initiation operation initiating a phone call with a first contact, wherein the phone call is displayed on a graphical user interface (GUI) of the telecommunications device as a call icon; receiving a touch operation touching a contact icon displayed on the GUI, wherein the contact icon represents a second contact; and receiving a drag operation dragging the contact icon onto or near the call icon of the GUI to initiate a teleconference between a user of the telecommunications device, the first contact, and the second contact.

A method of initiating a conference call on a telecommunications device may include: receiving a first initiation operation initiating a first phone call with a first contact, wherein the first phone call is displayed on a graphical user interface (GUI) of the telecommunications device as a first call icon; receiving a second initiation operation initiating a second phone call with a second contact, wherein the second phone call is displayed on the GUI as a second call icon; receiving a touch operation touching the first call icon; and receiving a drag operation dragging the first call icon onto or near the second call icon to initiate a teleconference between a user of the telecommunications device, the first contact, and the second contact.

BRIEF DESCRIPTION OF THE DRAWINGS

FIG. 17A is a table (Table 1) illustrating and describing various controls (buttons, icons, etc.) that may be used as part of the phone apparatuses described herein.

FIG. 17B is another example of controls (icons, buttons, etc.) that may be included as part of the phone apparatuses described herein.

DETAILED DESCRIPTION

Apparatus (systems and devices) and methods of use are described herein for telecommunications devices, such as phones, including but not limited to desktop phones, cell phones, mobile phones, videophones, and the like. An example of a telecommunications system, including telecommunications devices, is shown below. These exemplary telecommunications apparatus (devices and systems) may include any of the features and configurations described herein, including the buttonless (e.g., drag and drop) features, and well as the remote activation of high-level functions in a local phone by a remotely located server, as described in detail below.

In particular, described herein are phone systems that may include a local (e.g., desktop, handheld, or portable) phone unit configured to make and receive calls, which may be referred to as a "client" phone, and a remote phone "server" with which the client phone can communicate. The client phone may operate autonomously as a simplified traditional (hard) phone that is adapted to call out through a standard phone exchange (e.g., Public Switched Telephone Network), but may also operate as a client phone that simultaneously or alternatively contacts a remote server (e.g., a cloud-based server) that processes the call and remotely enables advanced functions. Thus, apparatus and methods are described in this disclosure wherein a central or cloud server handles advanced call features for individual telephones of a telephone system. A local, client phone (including, e.g., a hard phone or a soft phone) can be used to connect to the remote cloud server, and the cloud server can then handle all subsequent advanced call features. The cloud server can make call transfers, handle voicemail services, connect multiple lines in conference calls, park calls, etc.

In some variations the telecommunications devices may be configured as "button less" telecommunications devices. A button less telecommunications device can include a graphical user interface (GUI) for performing the methods and tasks described herein. A user can swipe a screen of the device, such as a touchscreen, to interact with an operating system of the telecommunications device to perform a number of features, including placing telephone calls, sending contact information, joining calls into a teleconference, or transferring calls to another person.

Figure 1:
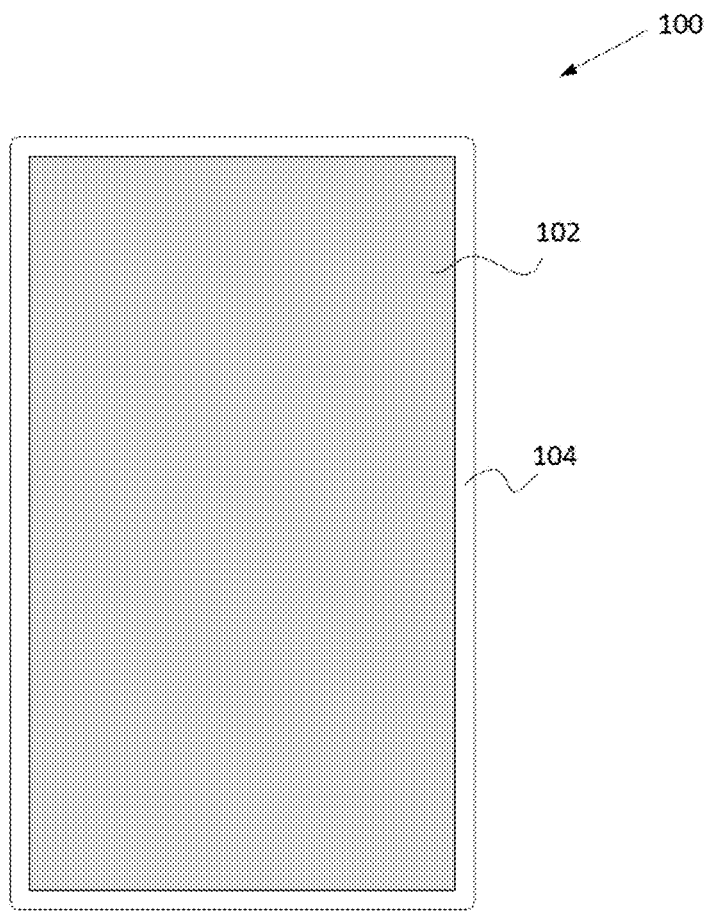
FIG. 1 shows one embodiment of a telecommunications device (e.g., phone) having a touchscreen display.

FIG. 1 shows one embodiment of a telecommunications electronic device 100, having a display 102 disposed in a housing 104. This example is shown as a mobile phone, although any of these features may be implemented in a desktop phone. The display can be a touchscreen display, such as a capacitive touchscreen, a resistive touchscreen, or another type of touchscreen display as known in the art. The mobile electronic device can further include electronics (not shown) disposed in the housing, such as a processor (CPU), memory, storage for software and an operating system such as a hard drive or SSD, an energy supply such as a battery, antennas including wifi and cellular, and any number of additional electrical components typically found in mobile devices such as mobile phones or tablets. The telecommunications device can include an operating system that comprises software code stored on storage of the device. A user of the device can interact with the operating system via the touchscreen display, and therefore the mobile electronic device does not require physical buttons or controls.

The data structures and software code described in this disclosure are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Several embodiments of a graphical user interface (GUI) for an electronic telecommunications device will be described herein. The GUI can be specifically tailored for a mobile, desktop, or other type of phone, and can include various methods for interacting with a phone and performing tasks associated with the phones, such as making and receiving calls, interacting with contact lists, transferring calls, initiating conference calls, and the like.

Figure 2:
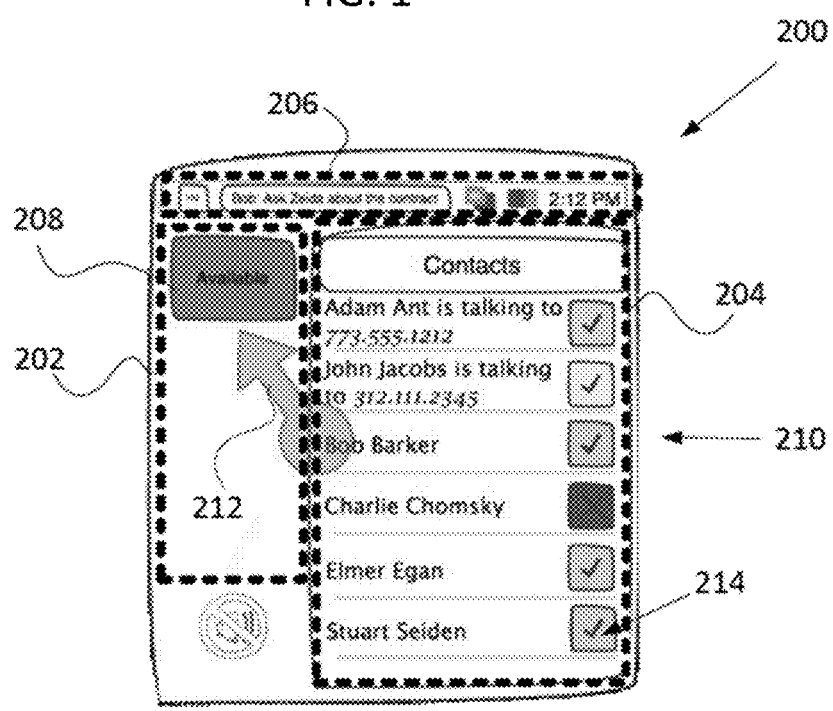
FIG. 2 shows one embodiment of a GUI for interacting with a telecommunications (phone) operating system, including methods of placing telephone calls by dragging a contact icon into a calls icon.

FIG. 2 shows one embodiment of a GUI screen on a telecommunications device 200. For purposes of discussion, the GUI screen can be divided into at least two regions (e.g., sections), such as a first "available calls" section 202 and a second "contacts list" section 204. In the illustrative embodiment, the available calls section 202 is located on the left side of the GUI screen, and the contacts list section 204 is located on the right side of the GUI screen. It should be understood that the position and size of these sections can vary in different embodiments, including swapping these locations, shrinking or enlarging these sections on the display, putting the contacts list section above the available calls section or vice versa. Furthermore, one or more additional sections, such as an additional third (e.g., information) section 206 can be displayed on the GUI. The additional information section can include, for example, date/time information, battery indicators, cellular service or wifi strength indicators, or push notifications (e.g., new email, social media notifications, voicemail notifications, software updates, etc.). This additional information is typically displayed at or near the top portion of a GUI screen of mobile devices, but it should be understood that the information can be displayed elsewhere on the screen, or not at all. The available calls section 202, the contacts list section 204, and the additional information section 206 are all shown in FIG. 2 as distinct spaces surrounded by dashed lines. The dashed lines are merely for purposes of discussion and may not actually be visible to a user of the GUI screen.

The available calls section of the GUI screen can display the number of simultaneous calls supported by that phone device. For example, a phone that supports only a single call at a time could display a call icon 208, shown in FIG. 2 as being an "available call." Phones that support multiple simultaneous calls can include additional call icons arranged in the available calls section 202 of the GUI screen. In the embodiment of FIG. 2, these additional available call icons may be arranged vertically so as to be arranged in the available calls section of the GUI screen. Other visual implementations are considered, including horizontal alignment, stacking, grouping into folders, tiling, or fanning of multiple icons, etc.

The contacts list section 204 of the GUI screen can include a list of contacts 210 stored on the device. The contacts list section can display the names, phone numbers, email addresses, and/or additional contact information for each user contact 210. In some embodiments, the amount of information to be displayed in the contacts list section can be customized, so the user can specify which contact information (e.g., name only, name and number, name and email) is displayed. For contact lists that are longer than the size of the touchscreen display, the user can scroll through contact list by placing a finger on the touchscreen display and dragging or tapping the display to scroll through the remainder of the contact list.

Referring still to FIG. 2, a method of placing a call on a telecommunications phone will be discussed. In the illustrated embodiment, a user can place a phone call by tapping or touching a contact or contact icon 210 in the contact list section 204 and dragging the virtual contact onto the call icon 208 in the available calls section 202, as shown by arrow 212. Alternatively or additionally, the user can place a phone call by tapping the contact to select the contact, and then tapping the available call icon.

In some embodiments, the contact list section 204 can include availability information 214 for each contact. The availability information can indicate to the user if each contact is available for a telephone call. In some embodiments, the availability information can indicate to a user that the contact is available, in the form of an icon that indicates the user is available (e.g., a checkmark, a color such as a "green light" icon, or similar), or a message in text near the contact that indicates that the contact is available. Similarly, the availability information 214 can also indicate to the user that the contact is unavailable (e.g., an "x", a color such as a "red light", or similar), or a message in text that indicates that the contact is unavailable. The availability information can even include information as to why the contact is unavailable. For example, the availability information 214 can display to a user that a particular contact is on the phone or busy, and can even indicate to whom that contact is speaking with in some embodiments. Referring to FIG. 2, the availability information 214 can indicate to the user that contacts "Adam Ant" and "John Jacobs are talking to a specific phone number or contact, that "Charlie Chomsky" is unavailable, and that "Bob Barker", "Elmer Egan", and "Stuart Seiden" are available for a telephone call.

Figure 3:
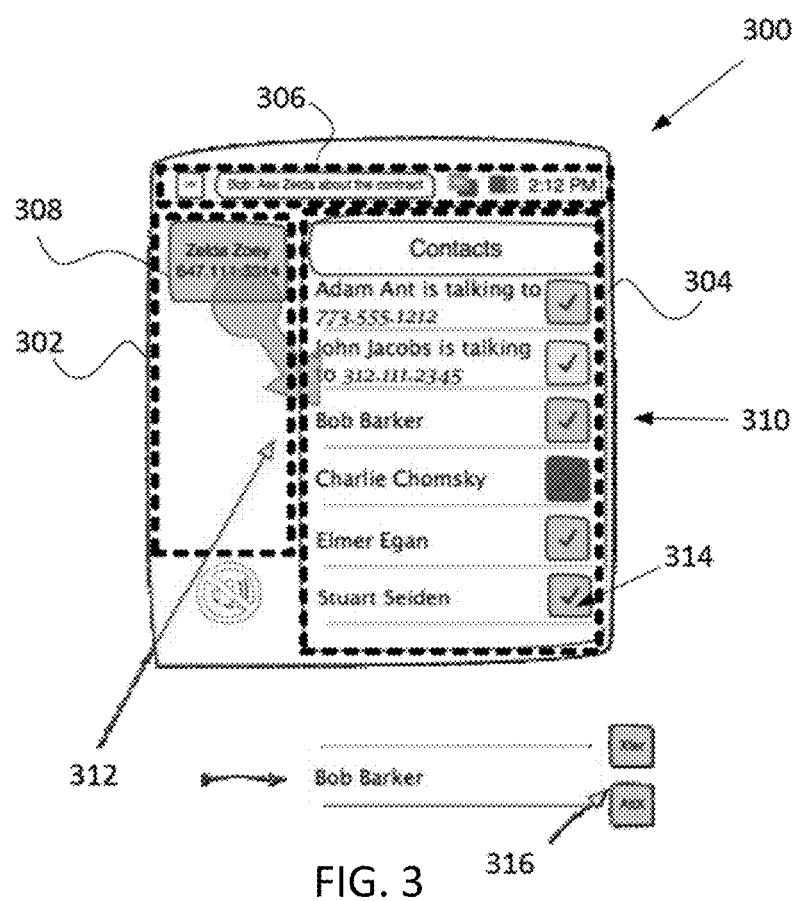
FIG. 3 shows one embodiment of a GUI for interacting with a telecommunications device operating system, including methods of placing transferring a phone call by dragging a call icon into a contacts icon.

FIG. 3 shows another embodiment of a GUI screen on a telecommunications device 300. The GUI screen can include some or all of the features described above, including available calls section 302, contact list section 304, additional information section 306, call icon(s) 308, contact (s) 310, and availability information 314. The embodiment of FIG. 3 includes a method of transferring a first contact to a second contact, to place the first contact in communication with the second contact. In the illustrated embodiment, the user is connected on a phone call to contact named "Zelda Zoey" as indicated by the call icon 308. While the user is connected to that contact, the user can transfer the contact to another contact in the contact list section by tapping or touching the call icon 308 in the available calls section 308 and dragging the virtual contact onto the desired contact 310 in the contacts list section 304, as shown by arrow 312. In an alternative embodiment, the user can transfer the contact by tapping the call icon to select the contact, and then tapping the desired contact in the contacts list section. So in the example of FIG. 3, the user can drag contact "Zelda Zoey" from the available calls section 302 to contact "Bob Barker" in the contacts list section 304 to transfer "Zelda Zoey" to "Bob Barker." In some embodiments, dragging the contact 310 to a contact in the contact list can bring up a menu 316 with multiple options on what to do, including, for example, a transfer feature (shown as "Xfer") or an AttX feature (shown as "AttX"). The user can then select the desired function or feature from the menu 316.

Figure 4:
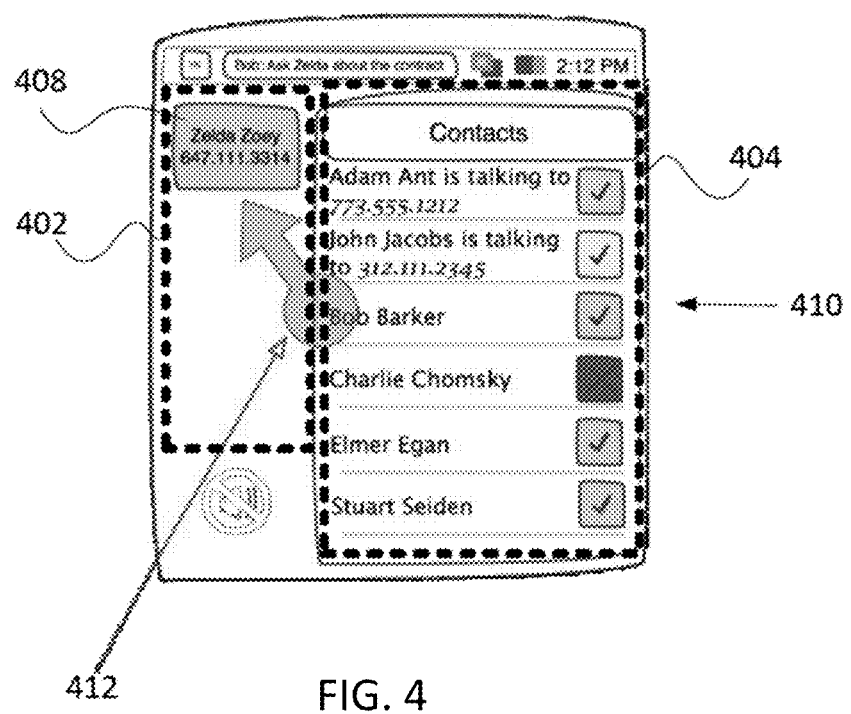
FIG. 4 shows one embodiment of a GUI for interacting with a telecommunications device operating system, including methods of creating a conference call by dragging a contact icon into a call icon.

FIG. 4 shows an embodiment of a GUI screen on a telecommunications device 400. The embodiment of FIG. 4 describes a method of adding a contact to a teleconference call. The method of FIG. 4 can be implemented similar to how the method of transferring calls is implemented in FIG. 3. For example, in the FIG. 4, the user is connected on a phone call to contact named "Zelda Zoey" as indicated by the call icon 408. While the user is connected to a contact, the user can add another contact to the current call to create a teleconference call by tapping or touching a contact 410 from the contacts list section 404 and dragging the virtual contact onto the call icon 408, as shown by arrow 412. In an alternative embodiment, the user can create the teleconference by tapping the contact to select the contact, and then tapping the call icon to create the teleconference call. So in the example of FIG. 4, the user can drag contact "Bob Barker" from the contacts list section 404 to the call icon 408 in the available calls section 402 to create a teleconference call between the user, "Zelda Zoey", and "Bob Barker."

Figure 5:
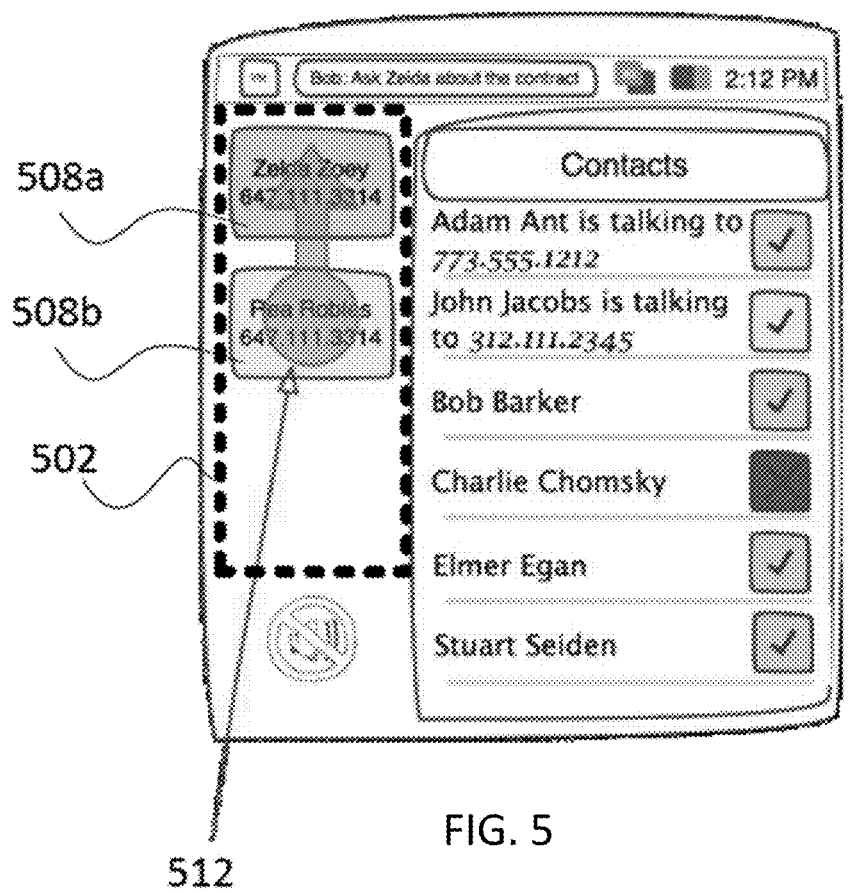
FIG. 5 shows one embodiment of a GUI for interacting with a telecommunications device operating system, including methods of creating a conference call by combining two calls into one.

FIG. 5 illustrates a similar embodiment to the embodiment of FIG. 4, but provides a slightly different method for creating a teleconference call between multiple parties. In FIG. 4, a teleconference call is created between the user, a contact that is on the line with the user, and a third party that is not currently on the phone. In FIG. 5, however, the user is on a call with two separate contacts on two separate lines, can join all the parties in a single teleconference call. Referring to FIG. 5, the user of the GUI screen is connected on a first call with a first contact, "Zelda Zoey", on a first phone line, indicated by call icon 508*a,* and is also connected on a second call with a second contact, "Rea Robles", on a second phone line, indicated by call icon 508*b*. According to this method, the user can tap or select one of the contacts, such as call icon 508*b,* and drag the icon onto call icon 508*a* to create a teleconference call between the first contact, the second contact, and the user.

In some embodiments, a user may wish to place a call, transfer a call, or initiate a teleconference with a telephone number that is not inputted as a contact in the contacts list section of the GUI screen. In these embodiments, the user can have the option to add a new contact, or alternatively, bring up a keypad to manually input a telephone number. The new number may show up a temporary icon, which may remain in the phone after the call for making future calls, e.g., in the contracts, or it may be transient and removed after making the call. The icon may include the number or a shorthand for the number, e.g., a portion of the number or an alphanumeric/name entered by the user or looked up from an external source.

In general, the GUI may include a number of functional regions or icons, including a call icon, a hold icon, a hang-up icon, or the like. Further, joined calls may be represented by a collective icon for the cluster of lines on the call. Each icon may represent a region of the GUI, and any call or cluster of calls (e.g., joined calls) may be dragged and dropped on these functional icons/regions. The functional icons may be locked in the various positions; alternatively, some or all of the functional icons may be movable and can be dragged and dropped.

For example, an active call (e.g., in the available calls section) may be selected by touching it (or a collective icon ideating a group call) and dragging it to a hang-up/call terminate icon (e.g., in the lower left of the screen).

As mentioned above, any of the features described above can be implemented with a manually inputted telephone number instead of a saved contact on the device.

The embodiments described above can be implemented in a telecommunications device (e.g., phone) that includes only a touchscreen display as an input device, i.e., a mobile device, a desktop phone device, etc. The device may not have physical buttons or keypads from which the user can input data into the device. In other embodiments, however, the device may include physical buttons.

Any of the telecommunications devices described herein may be tied into a telecommunications infrastructure that supports all the features. For example, multi-person (3, 4, 5, or more person) teleconference calls may be performed when the telecommunications infrastructure is capable of supporting such multi-person calling. Generally, the infrastructure may be able to uniquely, distinctly, and seamlessly add, remove, joint, or transfer calls. Although the drop-and-drag user interfaces described above may be used with any appropriate phone system, including hard and soft systems, it may be of particular interest in the hybrid local phone client/remote phone server systems described. In some embodiments, this can be implemented on the cloud side to support each of these autonomously. For example, the phone can send the instruction to the cloud, and the cloud can implement the instruction at the phone.

For example, advanced call feature handling (e.g., transfers, voicemail, conferencing, call parking, etc.) may be implemented remotely, e.g., on the cloud, as opposed to handling those features on the actual phone hardware/software or local software.

Figure 6:
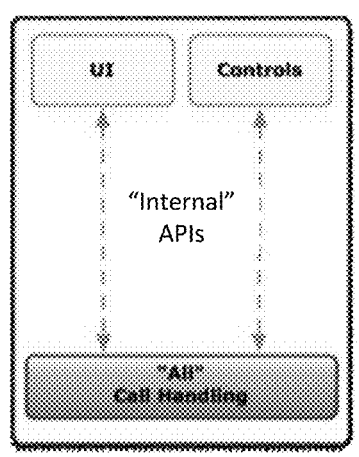
FIG. 6 is a schematic drawing showing a conventional "hard phone" architecture.

As described above, most conventional "hard phones", such as desk phones, cell phones, etc., comprise a single device that includes a user interface (e.g., a screen), controls (e.g., keypad, GUI, etc.), and the actual hardware/software that performs the call handling. These hard phones generally handle all call features on the hardware and software of the phone itself. So, for example, when a user places a call on hold, or transfers a call, or initiates a teleconference, the hard phone actually does the work. In some examples of hard phones, there may be an "internal API" that is used to connect the hardware/UI/controls, but it can also be implemented with only hardware. An API (e.g., application programming interface) may control some or all of the functioning of the phone. FIG. 6 represents a typical hard phone, in which a user interacts with the UI and controls of the phone, which are communicated to the hardware of the phone via the "internal APIs". The hardware of the phone manages all advanced call features of the phone.

Figure 7:
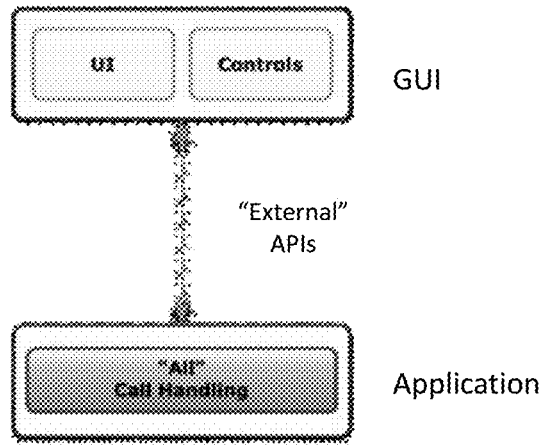
FIG. 7 is a schematic drawing showing a conventional "soft phone" architecture.

Traditional "soft phones" are slightly different than "hard phones." Typically, there is an application or operating system that runs on the underlying hardware and executes the advanced call processing, and there is a GUI (e.g., a user interface plus controls) that is developed based on APIs in the application or operating system (e.g., ANDROID™, SKYPE™ iPhone™ iOS, and virtually all "software phones"), as represented by FIG. 7. There can be variations of this embodiment, such as when the application or operating system runs on a server that is different from the computer/device/phone that the GUI is running on, but the essential function and operation is the same. In FIG. 7, a user interacts with the UI and controls of a phone, which are communicated to the application or operating system of the phone via the "external APIs". The application or operating system of the phone can then manage all advanced call features of the phone.

Figure 8:
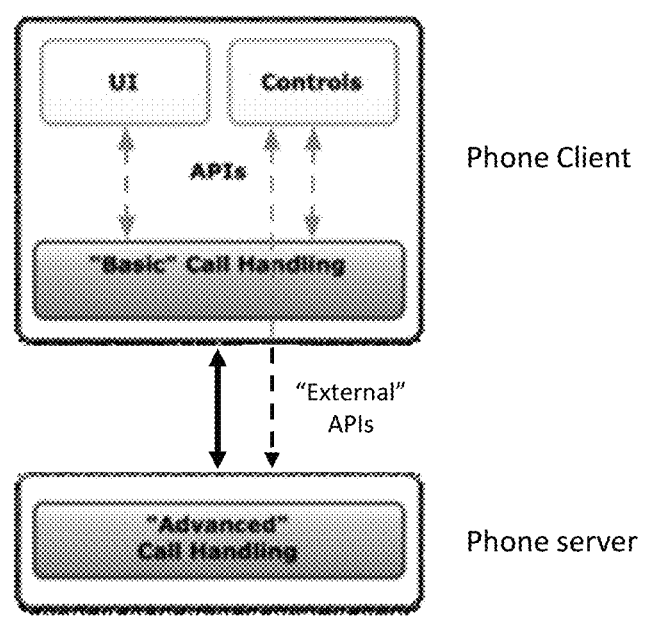
FIG. 8 is a schematic drawing of a novel phone architecture that handles both basic and advanced call features.

Described herein are systems that divide the way that advanced call handling is managed in telecommunications into remote (cloud) and local operations, while allowing a local phone to operate independently in situations where it cannot communicate with the remote server (phone server). In FIG. 8, the "phone" in a telephone system can be split into two parts, referred to herein as the "phone client", which can be the phone itself (e.g., a cell phone, or a soft phone such as a SKYPE phone) and the "phone server", which can be a server located on the cloud or internet. The phone system of FIG. 8 can be implemented as either a hard phone or a soft phone. The phone client part can be responsible for handling all only "basic" call handling features, such as initiating and answering phone calls. The controls and UI of the phone can interact with the phone client to manage "basic" call handling, but can instead interact with the phone server to manage "advanced" call handling, such as transfers, voicemail, conferencing, call parking, etc.

Referring to FIG. 8, the UI and controls of the phone can communicate with the phone client via internal APIs to handle basic call functions, such as placing calls and answering calls. When a user tries to initiate an advanced call function, such as a transfer, conference, etc., the phone client can communicate with the phone server via external APIs to handle those advanced call functions. In some embodiments, it can be required that all phone calls go through the phone server.

For example, in one variation, a local phone client is configured to merely place and receive calls. The local client may be used to place a call, for example, by engaging (e.g., picking up, turning on, etc.) the phone and dialing the desired (target) telephone number. The phone, rather than simply calling the number dialed under the local control of the phone, may first call the phone server. This may be done, for example, by initially communicating through the telephone exchange and/or directly over the internet (using an Ethernet connection, etc.). Once the local client phone has contacted the phone server, the phone server may then make the connection (e.g., dial or call) the target phone number. The phone server may therefor regulate how the phone call is controlled, including permitting or making available more advanced call management/handling steps, such as transfers, hold, voicemail, forwarding, conferencing, call parking, etc. The call to the phone server may be seamless; that is, the user making the call may not realize that the additional call routing to the phone server has been made.

As mentioned above, the actual control of the communication through the phone (e.g., transferring calls, placing a caller on hold, forwarding a call, accessing voicemail, conference calling, etc., including virtually any call-related feature) may be performed at the remote (phone) server. The local phone may be configured just to connect (make the initial call and/or receive calls). The local phone may have a controller, including buttons, or a touch screen as described above. However, inputs from these controls may be communicated to the remote server immediately and/or stored for transmission to effect control of calls on the local phone.

Communication between the local phone (client phone) and the phone server may allow control or selection of any of the additional or advanced features. For example, when contacting the remote phone server, the local client phone may identify itself uniquely (e.g., by a unique code) which may be verified (e.g., in a hand-shaking procedure). Based on the identity of the local phone, the remote server may present or enable certain features. Thus, features may be tailored (and/or metered) specifically to a phone or group of phones from the remote (e.g., cloud) server.

In some variations the local phone may be adapted to continuously or periodically communicate with the remote server, even when a call is not being placed. For example, the local phone may periodically communicate with the remote server to update locally resident control (e.g., software, firmware, etc.). The local phone may also communicate in parallel with the remote server when making outgoing or receiving incoming calls.

For example FIG. 8 illustrates a user placing a call on hold with the system described herein. First, a call to the user can be routed through the phone server before being delivered to the phone client of the user. When the user wants to place a call on hold, the phone client can communicate to the phone server to place that specific call on hold. This can be accomplished via an external API call. The phone server can respond by placing that call on hold, and can then communicate to the phone client that the call has been placed on hold (e.g., via the API response). In one embodiment, the phone server can place the call audio with music on hold, or some such response to indicate to the user that the call has been placed on hold. The same type of interaction can happen for all advanced features, such as, transfers, voicemail, conferencing, call parking, etc.

The phone system configuration, in which a local client phone communicated with and through a remote phone server that functionally modifies calls made through the client phone a the remote server, can provide a tremendous amount of bandwidth savings for advanced call functions, particularly conference calls. Since phone server handles these bandwidth heavy features, a user does not tie up or saturate his cellular, phone, or internet connection with advanced call handling as would be the case with a conventional hard phone or soft phone.

EXAMPLE 1

Phone System

Although, in general, virtually any phone system may be adapted to incorporate any of the features described herein, including the drag-and-drop and/or remote/local configurations described above, FIGS. 9-14 illustrate variations of telecommunications apparatus that may be particularly well suited to embodying the features and configurations described.

Figure 9:
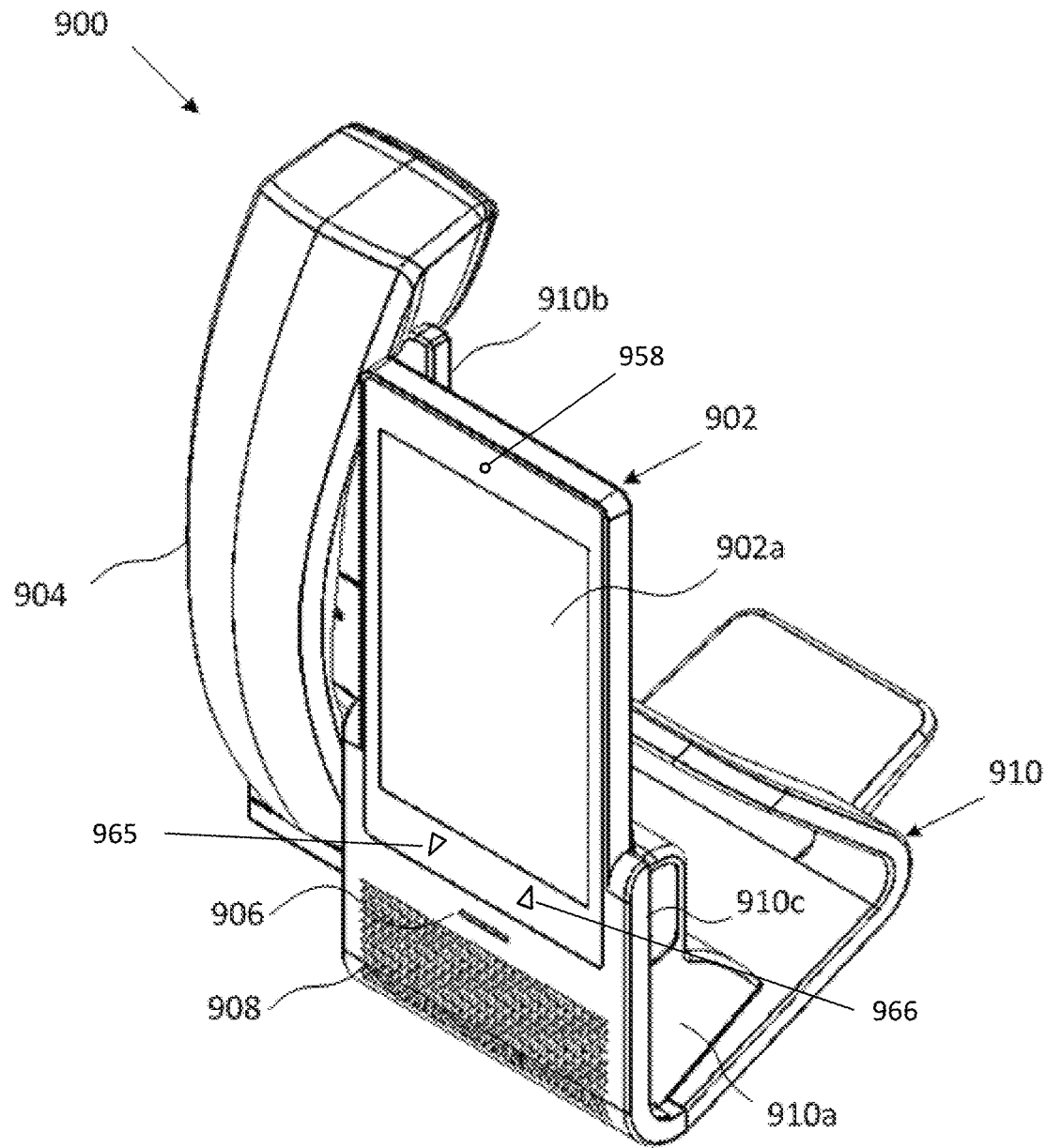
FIG. 9 is a perspective view of a Voice-over-IP ("VoIP") phone apparatus as described herein.
Figure 10A:
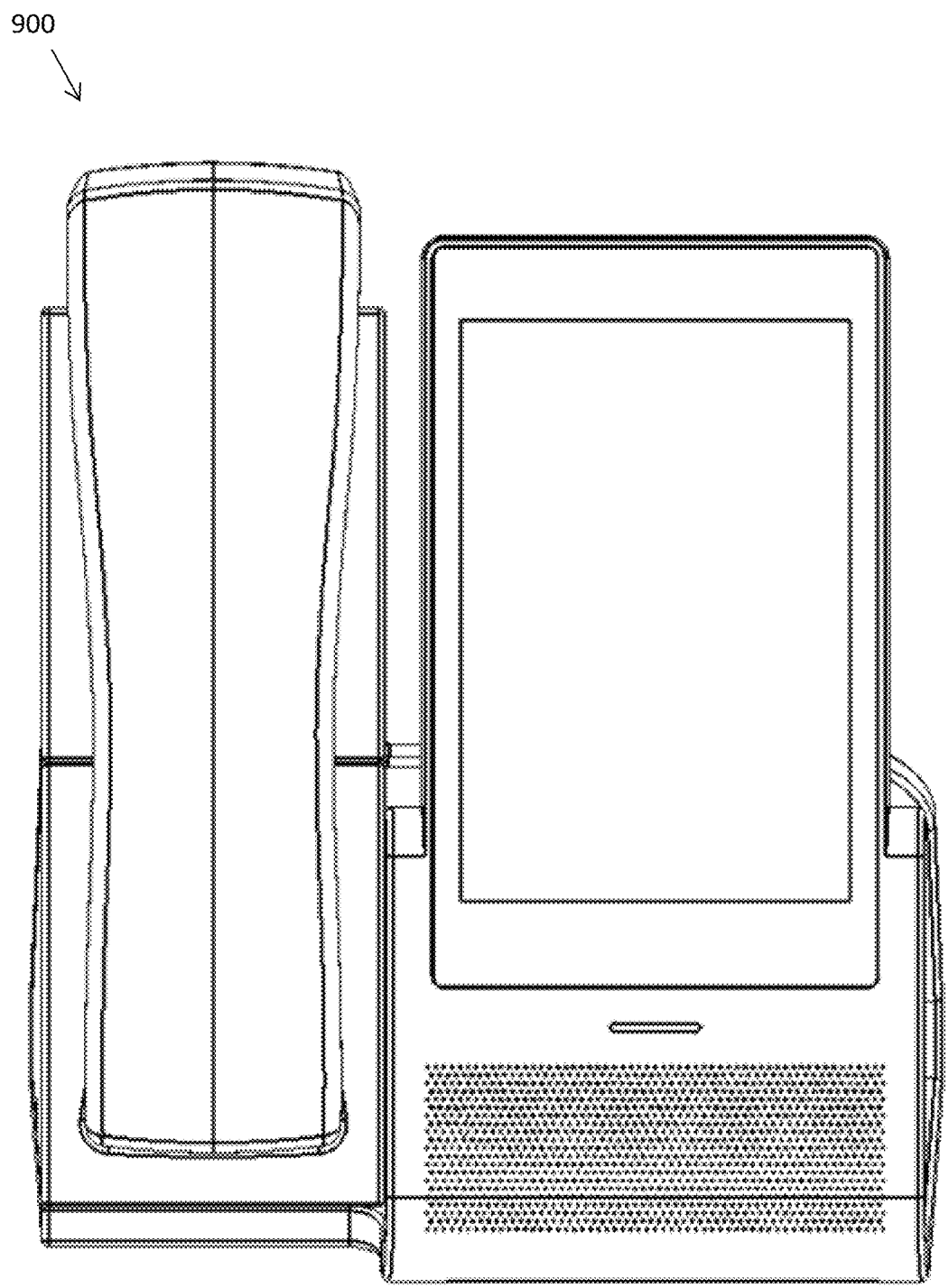
FIG. 10A is a front view of one variation of a VoIP phone apparatus.

For example, FIG. 9 shows a perspective view of a Voice-over-IP ("VoIP") phone apparatus 900 according to one embodiment of the present invention, and FIG. 10A is a front view of the VoIP phone device 900. As shown, VoIP phone apparatus 900 can be configured as a local (client) phone that can include a handset 904, a base structure 910, and a touch screen device 902. Base structure 910 can include a hook portion 910*b* for placing the handset 904, and a pedestal 910*a* for holding the touch screen device 902.

Any of the devices described herein (e.g., local phone client portions/devices) may include a camera 958. For example, the camera may be a built-in camera for taking photo or video, which may be used, e.g., in videoconferencing applications.

In any of the variations shown in FIGS. 9-14, the base structure is a docking bay for a smartphone (e.g., iPhone™, ANDROID™, etc.), and the smartphone may be adapted to operate as local (client) phone that interfaces with the handset. In such examples, the apparatus may include a cradle or connection for the smartphone; a separate screen may be used, or the screen shown (e.g., in FIGS. 9 and 13A, may be the smartphone screen. The smartphone may be adapted to interface directly with the cradle and use the headset. Thus, in FIG. 9, the touch screen device 902 can be, for example, a computing device that has a touch screen 902*a*, which is commonly used in smart phones and tablet computers. For example, touchscreen device 902 can have a computing device (including microprocessor, memory, storage device, and other necessary components) that utilizes the ANDROID™ operating system, or any other operating systems designed for mobile computing devices with touch screens. Touch screen 902*a* can also use any suitable touch screen technology currently known or later developed. FIG. 10B shows one example in which the screen if formed as part of a separable (and independently usable) smartphone.

Figure 10B:
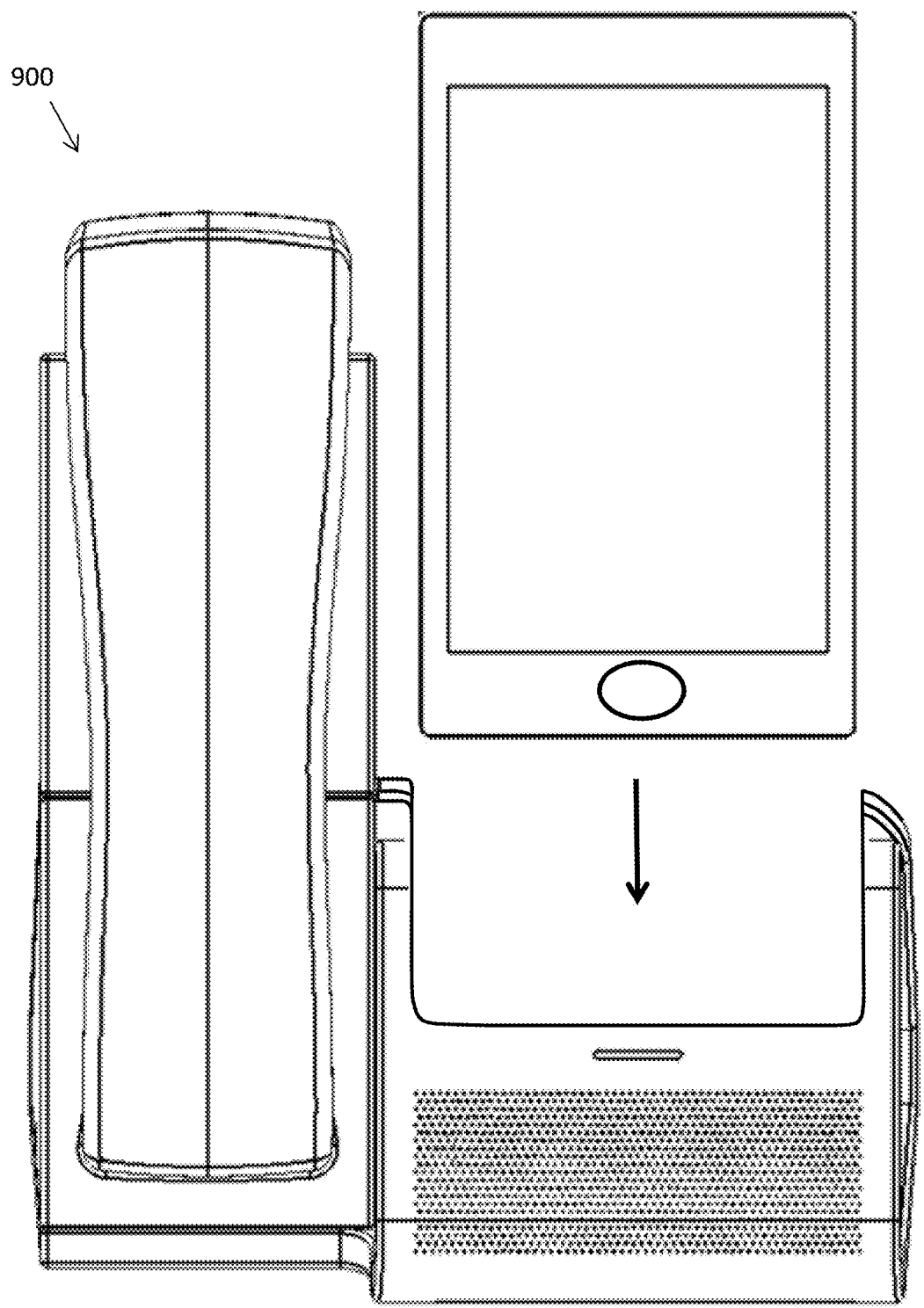
FIG. 10B shows a front view of an alternate variation of a phone system in which a base unit mates with a smartphone (e.g., iPhone™, ANDROID™ phone, etc.).

In the variation shown in FIG. 10A, the screen may be a dedicated screen, and the apparatus may not be adapted to dock and operate with a smartphone as shown in FIG. 10B.

Any of the local client portions/devices described herein may also include a volume control, which may be "soft" (e.g. part of the touchscreen/GUI) or "hard" (e.g., one or more physical button(s) on the housing of the device). For example, in FIG. 9, a down 965 volume and an up 966 volume button are included on the device.

In some variations, the upper portion of pedestal (base) 910*a* can have a slot 910*c*, and the lower portion of touchscreen device 902 (e.g., smartphone) can be slid into slot 910*c*, as shown in FIG. 10B. In some embodiments, touchscreen device 902 can be removed from base structure 910, and may function as a mobile smart phone device independently. Thus, the touch screen device 902 can have a rechargeable battery (not shown) to store and provide electrical power, a speaker (not shown) for producing sound, a microphone (not shown) for transforming sound (e.g., voice) into electric signals, a wireless voice communication module (e.g., a GSM or CDMA module), a wireless data communication module (e.g., a Wi-Fi module), and/or any other smart phone components known in the art. In other embodiments, touchscreen device 902 is rigidly attached to base structure 910, and therefore may or may not have components such as rechargeable battery, speaker, microphone, and/or various wireless modules.

In some variations, touchscreen device 902 can have an electrical connection with pedestal 910*a* for receiving electrical power from base structure 910. Touch screen device 902 can also have a data connection with pedestal 910*a*, for sending and receiving control signals and/or data signals through base structure 910. Such electrical connection and data connection can be realized by use of any suitable interface currently known or later developed. In some embodiments, the two types of connections mentioned above can be realized by use of a single interface, for example, a USB interface, a Power-over-Ethernet (PoE) interface, etc. Alternatively, they can be realized by use of separate interfaces. The data connection mentioned above can be a wired connection, such as an Ethernet or USB connection, or a wireless connection, such as a Bluetooth connection, a Wi-Fi connection, or any other wireless connection currently known or later developed.

In some variations, an LED indicator 906 is located on the front of pedestal 910*a* to indicate whether the VoIP phone device 900 is connected with a power source.

In general, the front surface of pedestal 910*a* can also have a set of small holes 908 on it that permits sound waves to pass through them. Inside pedestal 910*a*, there may be a speaker (not shown) to generate sounds from electrical signals and transmits the generated sounds outside of pedestal 910*a* through small holes 908. Similarly, pedestal 910*a* may also have a microphone (not shown) located inside which can receive sound waves through holes 908 and convert received sound waves into electrical signals. The speaker (not shown) and/or microphone (not shown) can be connected to the touch screen device 902 through a data connection as previously discussed.

Handset 904 can be a conventional telephone handset with a microphone on one end and a speaker on the other end, and can be placed on the hook portion 910*b* of base structure 910 when the user is not using the VoIP phone device, or when the user is using the "speaker phone" feature when making a call. Handset 904 may be connected with the base structure 910 and/or touch screen device 902 through a wired connection, or a wireless connection, through which it may transmit and receive electrical signals representing sound.

A user, when making a call, can pick up the handset 904. Picking up the handset 904 may trigger an electrical signal to be sent from the hook portion 910*b* to the touch screen device 902, and the signal may in turn trigger an event in a software application for making VoIP calls that is running on touch screen device 902. For example, upon receiving the triggered event, the software application may display a dialer screen on the touch screen 902*a* for the user to dial a telephone number. The apparatus may be configured to allow any of the drag and drop features, including any of the GUIs or user screens shown and described above, such as in FIGS. 2-5.

In some variations the base structure 910 may also have a button (not shown) that allows the user to initiate the "speaker phone" feature of the VoIP phone device 900. For example, the "speaker phone" button may be located on hook portion 910*b* of base structure 910. When the user presses the "speaker phone" button, a certain electrical signal may be triggered and sent to touch screen device 902, and the signal may in turn trigger an event in a software application for making VoIP calls that is running on touch screen device 902. For example, upon receiving the triggered event, the software application may display a dialer screen on the touch screen 902*a* for the user to dial a telephone number. Touch screen device 902 may also turn on a microphone and a speaker that can be located within base structure 910 (e.g., in pedestal 910*a*) for the user to conduct a phone call.

Figure 11:
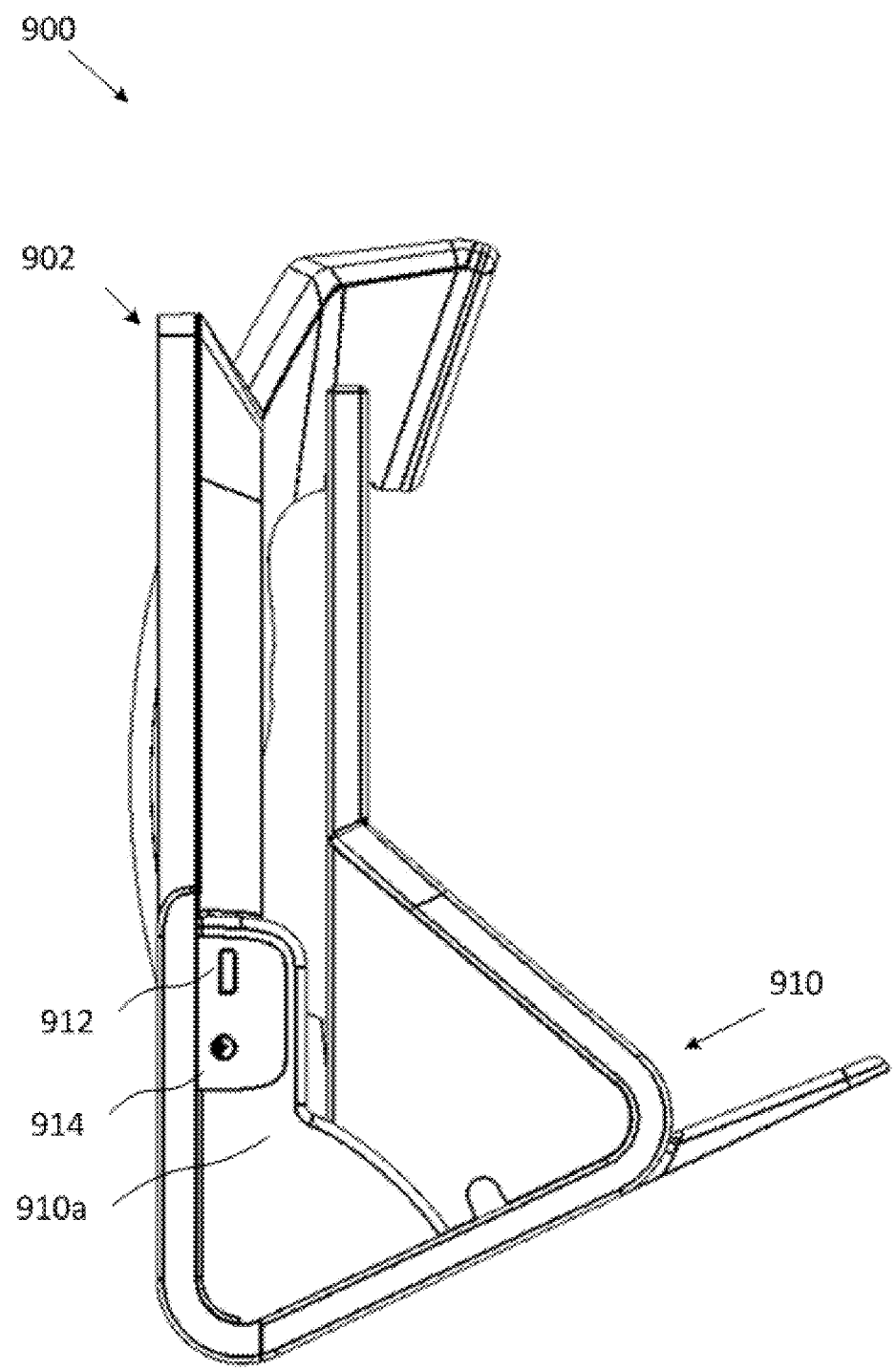
FIG. 11 is a side view of one variation of a VoIP phone apparatus.

FIG. 11 is a side view of a VoIP phone device 900 according to one embodiment of the present invention. As shown, the pedestal 910*a* of base structure 910 of device 900 can have a socket 912 which is a USB interface (e.g., a Micro USB interface), and can also have a socket 914 which is an audio port/interface. These interfaces can be connected with touch screen device 902. By using USB interface 912, the user may connect the VoIP phone device 900 (e.g., touch screen device 902) with an external computing device in order to download or upload data from or to the touch screen device 902. By using the audio interface 914, the user may connect the VoIP phone device 900 (e.g., touch screen device 902) with an external earphone or headphone for conducting a phone call with the external earphone or headphone. Interfaces 912 and 914 provide the user with additional convenience but may not be present in some embodiments of the present invention. In some embodiments, interfaces 912 and 914 may be located on touch screen device 902 instead of on pedestal 910*a*.

Figure 12:
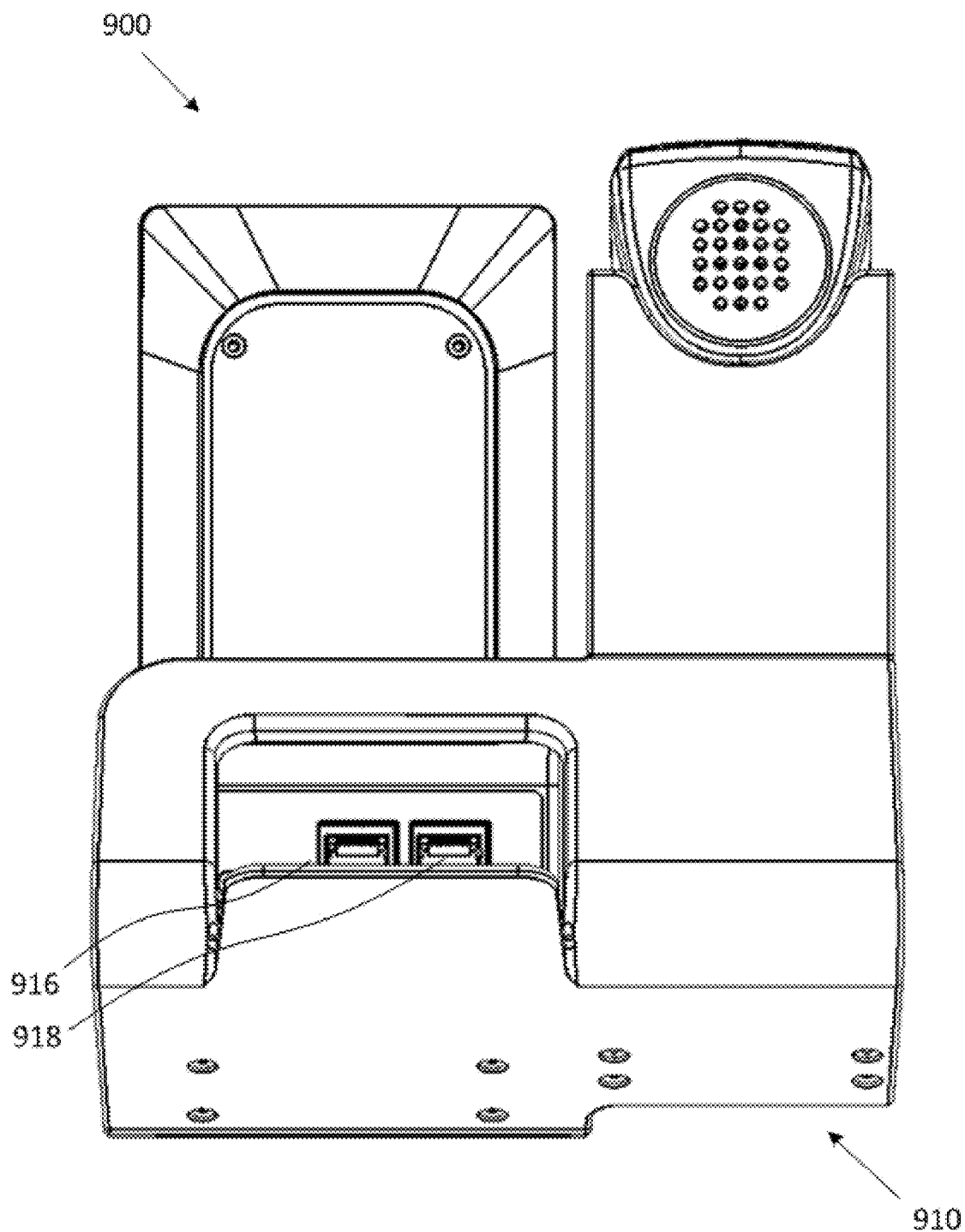
FIG. 12 is a back view of one variation of a VoIP phone apparatus.

FIG. 12 is a back view of the VoIP phone device 900 described above. As shown in this embodiment, a Power-over-Ethernet (PoE) port 916 is located on the back of base structure 910. Through PoE port 916, by use of an Ethernet cable (not shown), VoIP phone device 900 can be connected with a server, gateway, or network (not shown). This Ethernet connection allows the VoIP phone device 900 to send and/or receive data packets containing voice and/or control data to and from a remote destination when making a VoIP call. In some embodiments, VoIP phone device 900 may also have a second PoE port 918 that is used for bridging.

In other embodiments, VoIP phone device 900 may establish an IP connection with an external device or network through a wireless connection. For example, VoIP phone device 900 can have a Wi-Fi module for creating a wireless connection with a Wi-Fi access point. In this case, device 900 does not need to have an Ethernet port.

FIGS. 13A-13D show perspective views of a VoIP phone device 1300 according to one embodiment of the present invention. As shown, device 1300 has a relatively large touch screen device 1302 that resembles a tablet computer.

Figure 13A:
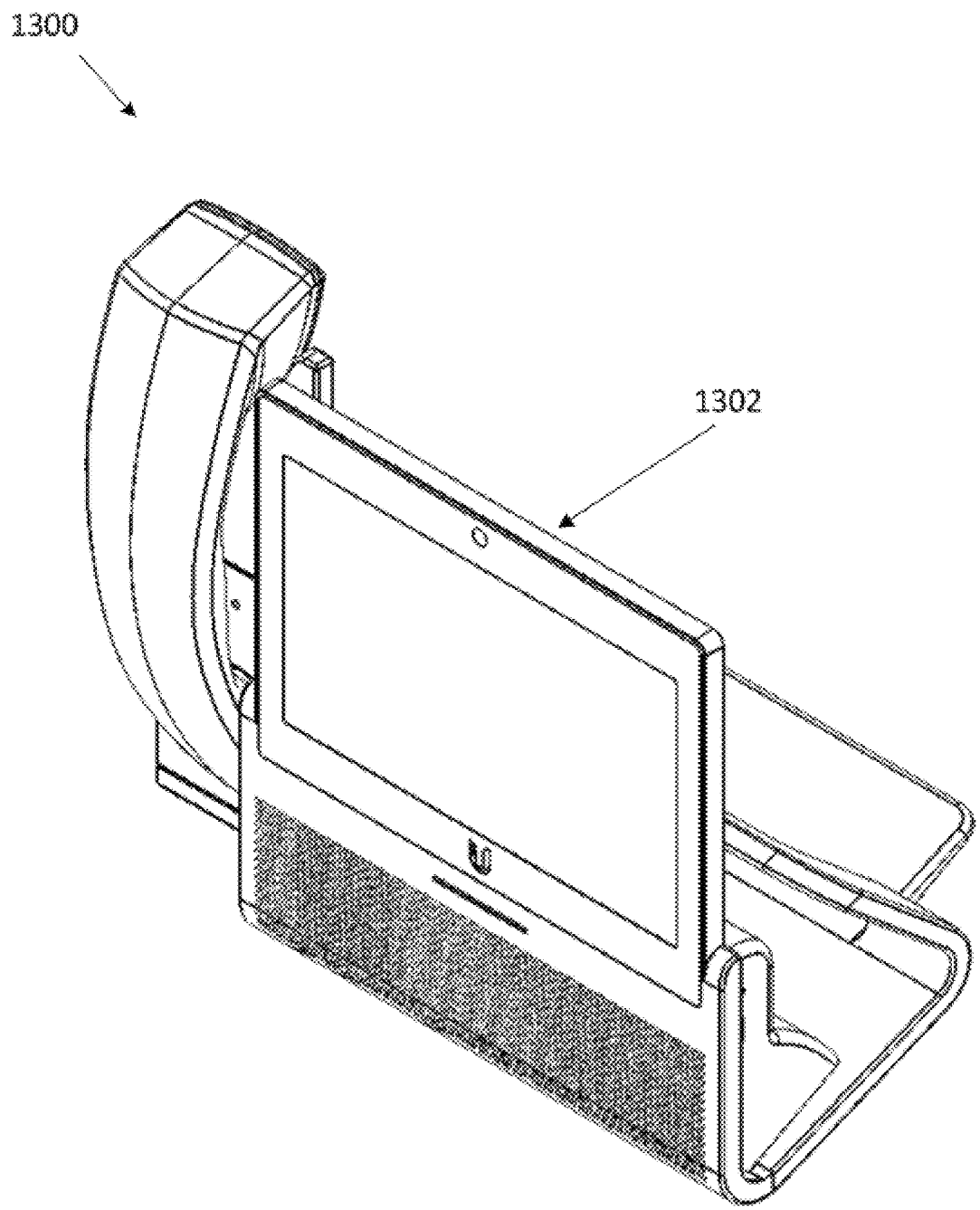
FIGS. 13A, 13B, 13C and 13D show front perspective, front, side and back perspective views, respectively of another VoIP phone apparatus.
Figure 13B:
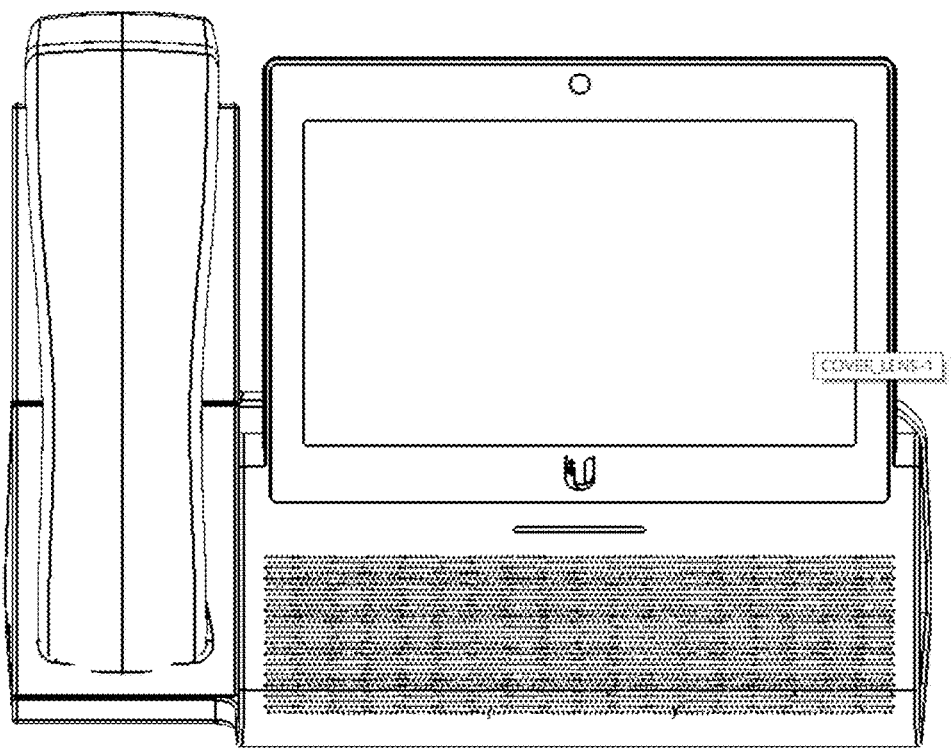
Figure 13C:
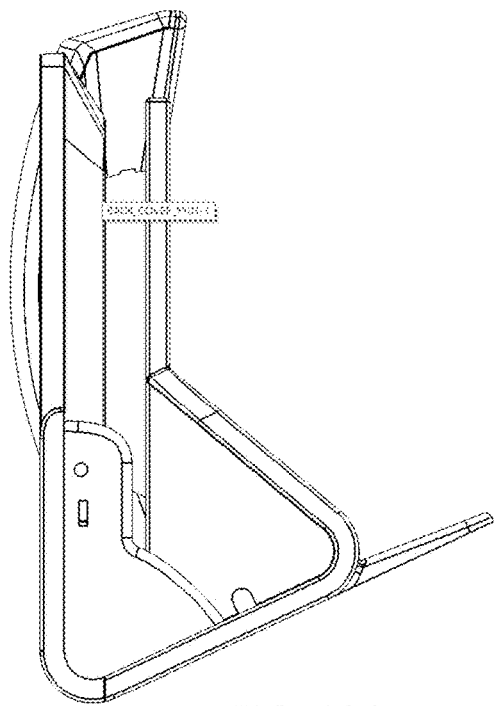
Figure 13D:
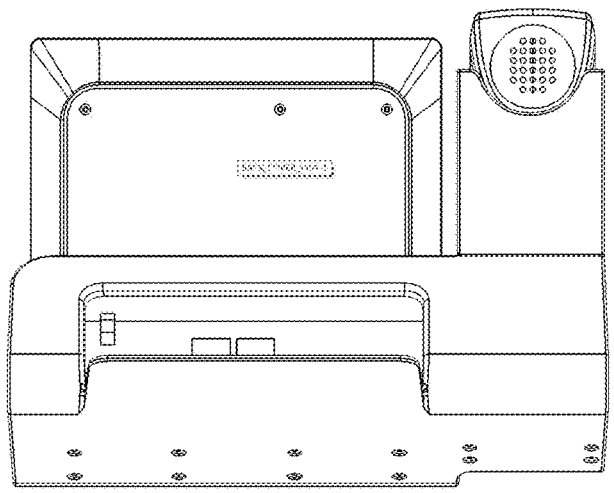
Figure 13E:
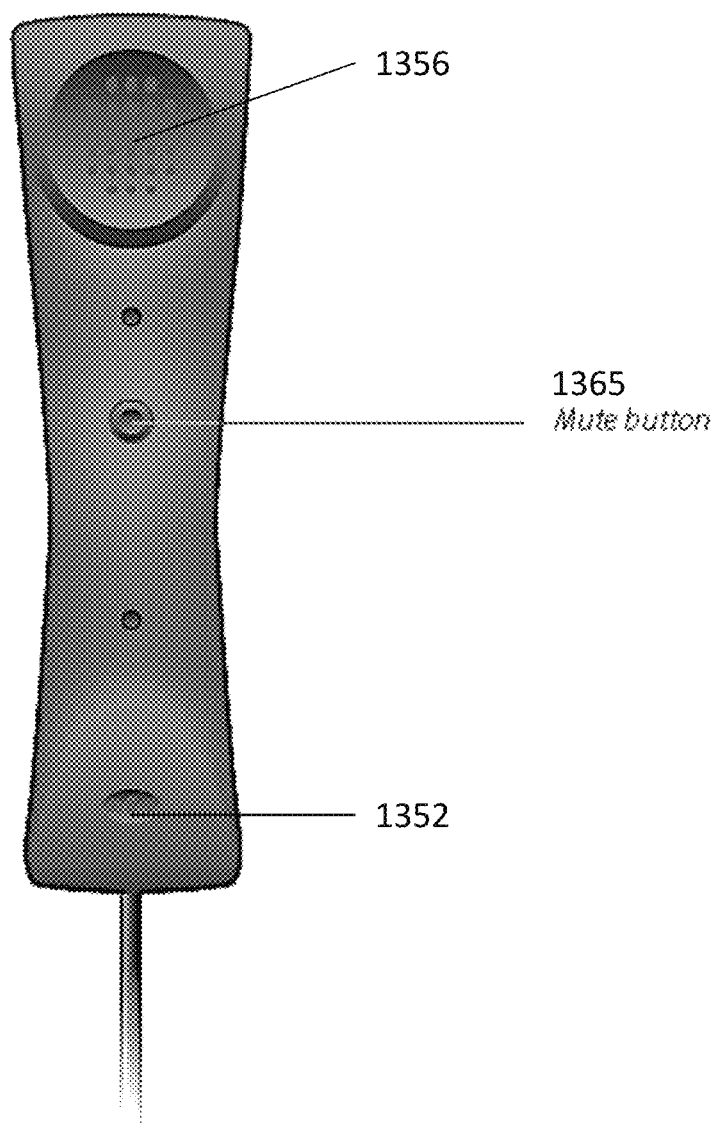
FIG. 13E shows an example of a handset that may be used with any of the local phone client devices described herein, including a mute button.

FIG. 13E shows an example of the front side of a handset that may be used with any of the local phone client portions/devices described herein. In this example, the phone headset includes a microphone 1352 and speaker 1356 and a mute button 1365. The mute button may be configured to locally control muting of the microphone(s) on the phone (including both the headset microphone and/or any other microphones on the body of the device.

Figure 14:
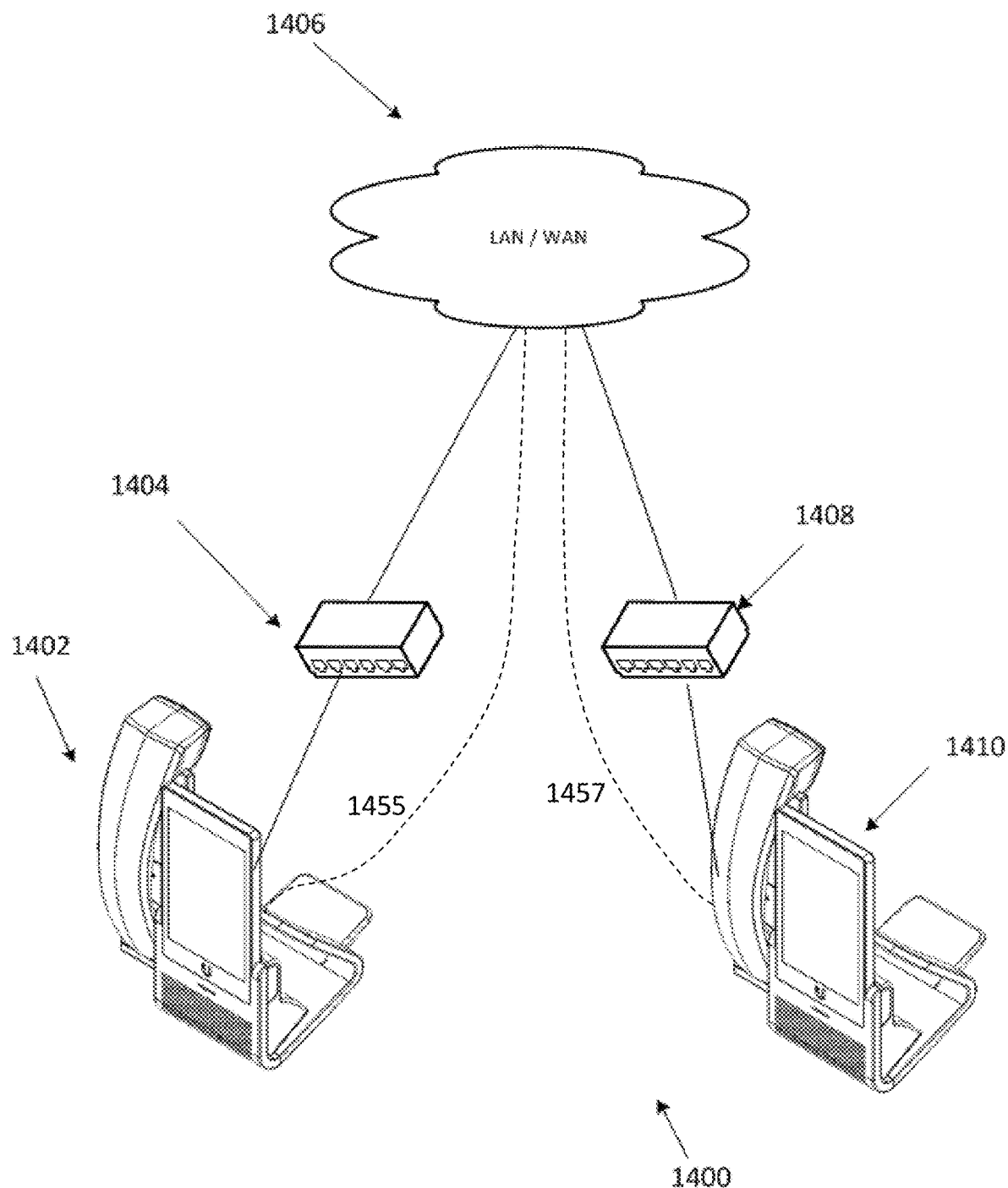
FIG. 14 is a diagram showing a system including two VoIP phone apparatus as described herein.
Figure 16:
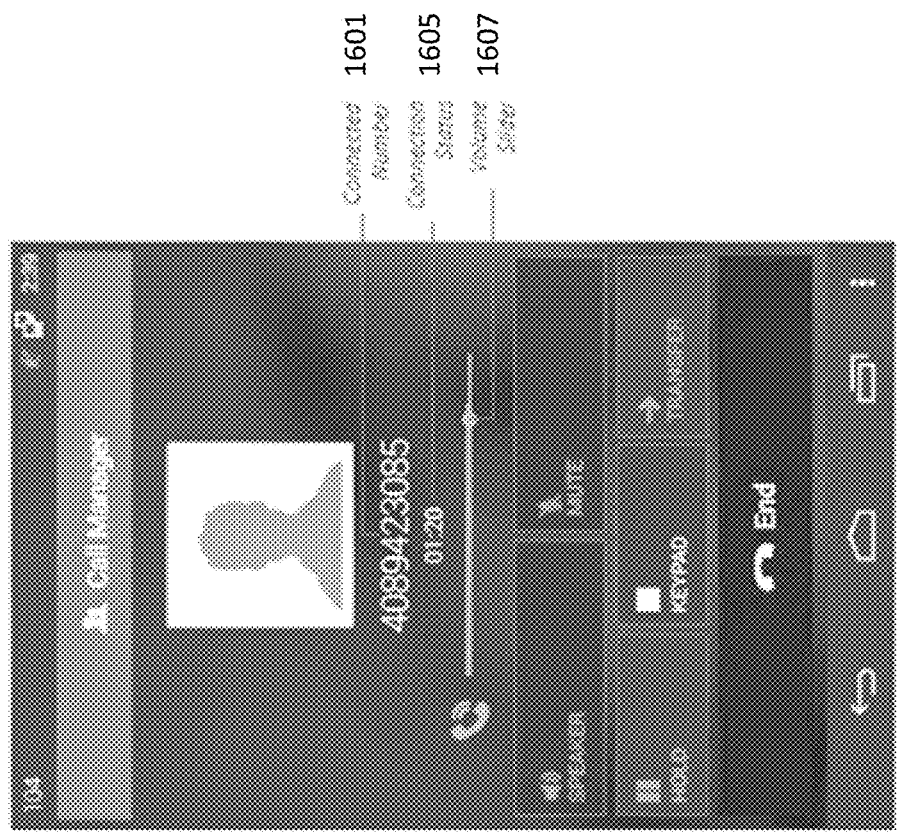
FIG. 16 is another example of a display screen that may be used as part of a phone apparatus.

FIG. 14 is a diagram showing one variation of a system 1400 including multiple local ("client") VoIP phone devices 1402 and 1410 connected to a server 1406 according to one embodiment of the present invention. As shown, VoIP client phone devices 1402, 1410 may include a data connection with switches 1404, 1408 to a LAN/WAN 1406. With such a system 1400, two users can make voice calls with each other by use of VoIP phone devices 1402 and 1410.

Alternatively, the client devices 1402, 1410 may directly connect 1455, 1457 to a server 1406. For example a local phone client device 1402 that includes a user interface for controlling operation of the phone may be configured to locally perform basic call handling including initiating new phone calls and answering incoming phone calls. For example the phone may be a standard phone with hardware, software and/or firmware for allowing the local client device to make at least one call out (e.g., to a server or direct client calls) and to receive local user inputs (e.g., requests to dial a particular number or numbers, requests for command/controls such as mute, call forwarding, and any other advanced call handling feature) and to input/output audio information, as described above. The phone server portion may be remotely located relative to the local phone client portion. The remote phone server 1406 portion may be configured to receive requests from one or more local client devices/portions for call routing (e.g., call placing) and/or for advanced call handling. These commands may include unique and/or dynamic identifying information for the one or more client devices so that the remote portion can track and target the control of the remote devices. The remote portion can then operate on calls through the local phone client portion to remotely perform advanced call handling on calls on the local phone client. For example, advanced call handling may include one or more of: conferencing calls and placing existing phone calls on hold. The local phone client portion may be configured to automatically contact the phone server portion when a user initiates a call to a third party (e.g., the local phone portion receiving a call initiated by a user to a third party). As a default mode, if the remote serve portion is not available, the client phone may revert to a basic phone (e.g., connecting a call, but without access to the advanced features. Alternatively, the local client unit may be programmed by the remote unit so that even if not connected in the future, the local client may retain some advanced functionality. Thus calls may be made through the remote server 1406 and modified by the remote server and/or they may be made directly by the phone to a telecommunications network that does not include the remote sever.

When receiving calls on the client phone, the client phone may again communicate with the remotely located (e.g., cloud) phone server to allow the advanced call functions. For example, calls received into the phone may be routed through the remote server which can then call the local client phone and pass through the call. Alternatively or additionally, the local phone may directly receive incoming calls, when made by a second phone to contact the local phone.

EXAMPLE 2

In operation, any of the apparatuses (systems and devices) described herein may be operated to provide a VoIP phone/phone system that integrates easily into a network, including networks operating a secure gateway. For example, the phone(s) and phone systems may be operated in a system including a preexisting network (wireless network) having a secure gateway that operates with a Session Initiation Protocol (SIP) provider or comparable. A session initiation protocol (SIP) is a signaling communications protocol that is widely used for controlling multimedia communication sessions such as voice and video calls over Internet Protocol (IP) networks. The protocol may be used to define messages that are sent between endpoints which govern establishment, termination and other essential elements of a call. SIP can be used for creating, modifying and terminating sessions consisting of one or several media streams. SIP can be used for two-party (unicast) or multiparty (multicast) sessions. SIP has been developed and standardized in RFC 3261 as an application layer protocol designed to be independent of the underlying transport layer; it can run on Transmission Control Protocol (TCP), User Datagram Protocol (UDP) or Stream Control Transmission Protocol (SCTP), and can work in conjunction with other application layer protocols that identify and carry the session media. SIP may use the Real-time Transport Protocol (RTP) or Secure Real-time Transport Protocol (SRTP). The protocol may be encrypted (e.g., with Transport Layer Security (TLS)).

The local phones described herein may be used, e.g., on a desktop, and may be connected (e.g., via an Ethernet cable) to a switch (e.g., a 48V 802.3af compliant switch), via a port on the device.

Figure 15:
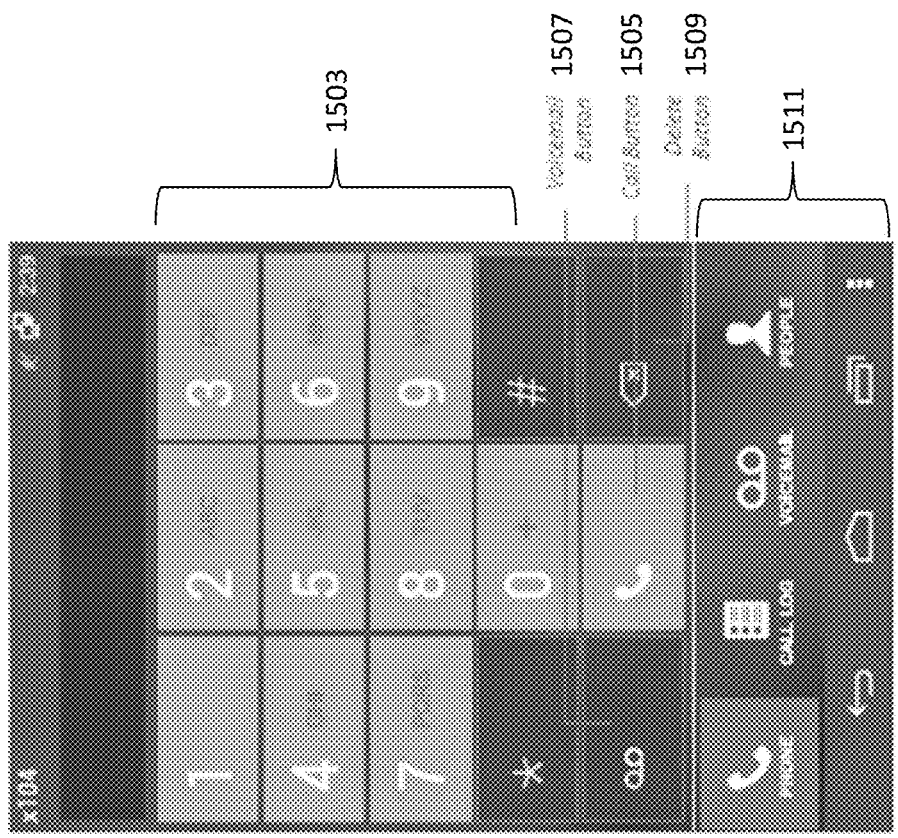
FIG. 15 shows one variation of a display screen that may be used as part of a phone apparatus.

In one example of operating the device to make a call, the headset can be lifted (or speaker engaged) and a dialer screen will appear. FIG. 15 shows one example of a dialer screen. In this example the screen is a touchscreen. A number (phone number) may be entered manually, or via a drag-and-drop application, as described above. For example, the numeric buttons 1503 may be pushed until the number is entered (the delete key 1509 may be used to correct mistakes). The Cal button 1305 can be pushed to make a call.

Once in a calling mode, a call manager screen may be displayed, showing the connected number 1601, connection status 1605, and a volume control (e.g., slider 1607). The connected number indicator 1601 shows the extension and/or phone number being dialed or that is currently connected. The connection status 1605 shows the connection status as dialing and/or displays the amount of time that the connected number was engaged. The volume control (slider 1607) can be moved to increase or decrease the volume level; in this embodiment the volume is a touch-screen control.

FIG. 17A (Table 1) is a table showing icons and describing how various controls that may be used with any of the local phone client devices (phones) described. Icons may be shown in a control portion 1511 of the screen (see, e.g., FIG. 15) and may be continuously displayed or may be accessed by 'swiping' (e.g. side-scrolling) the screen so slide new icons into view and displace other icons. Examples of controls and corresponding icons are listed in FIG. 17A, which also describes examples of how these controls may function to control the device. Additional examples are shown in FIG. 17B. As mentioned, these controls/icons may be included as part of GUI, and this GUI may be customized by the user to include these, remove some of these, or include additional buttons/controls.

Figures 18, 19:
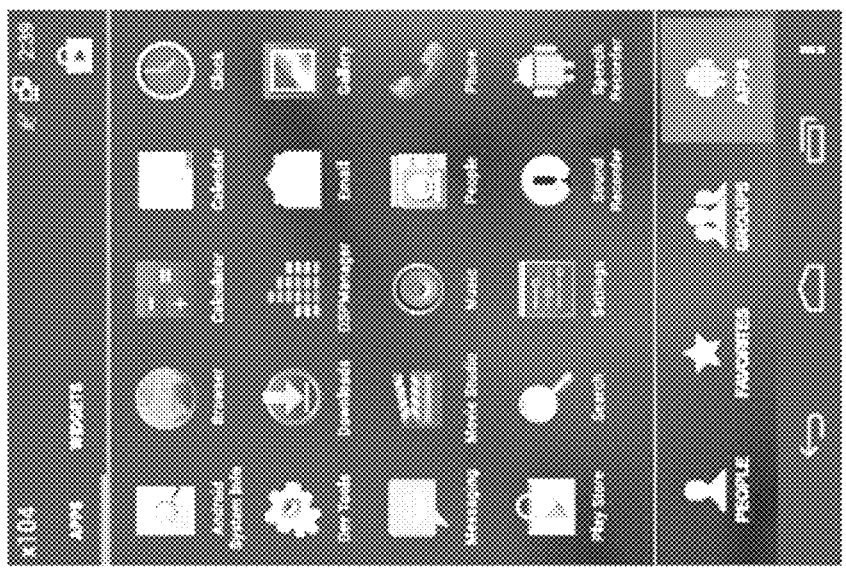
FIG. 18 is another example of a display screen that may be used as part of a phone apparatus.
FIG. 19 is a table (Table 2) providing exemplary values for various characteristics for one example of a local phone client.

In general the device may be used with other applications (e.g., application software/hardware/firmware), as mentioned above. Apps may be accessed using a control button; for example, FIG. 18 illustrate a sample screen that may be shown (replacing or "overlaying" the upper portion of the screen, e.g., compare to FIG. 15). For example, pressing the "APPS" icon may bring up an apps screen such as the one shown in FIG. 18. These application programs may be accessed (run/executed) by pressing the displayed icon).

FIG. 19 is a table (Table 2) that provides just one example of the specification that may apply to a local phone unit, including exemplary dimensions, weight, power characteristics (e.g., the apparatus may be powered by power over Ethernet or PoE), connectivity, and the like. These characteristics are only provided as an example any of these may be different or modified from those shown here.

Figure 20A:
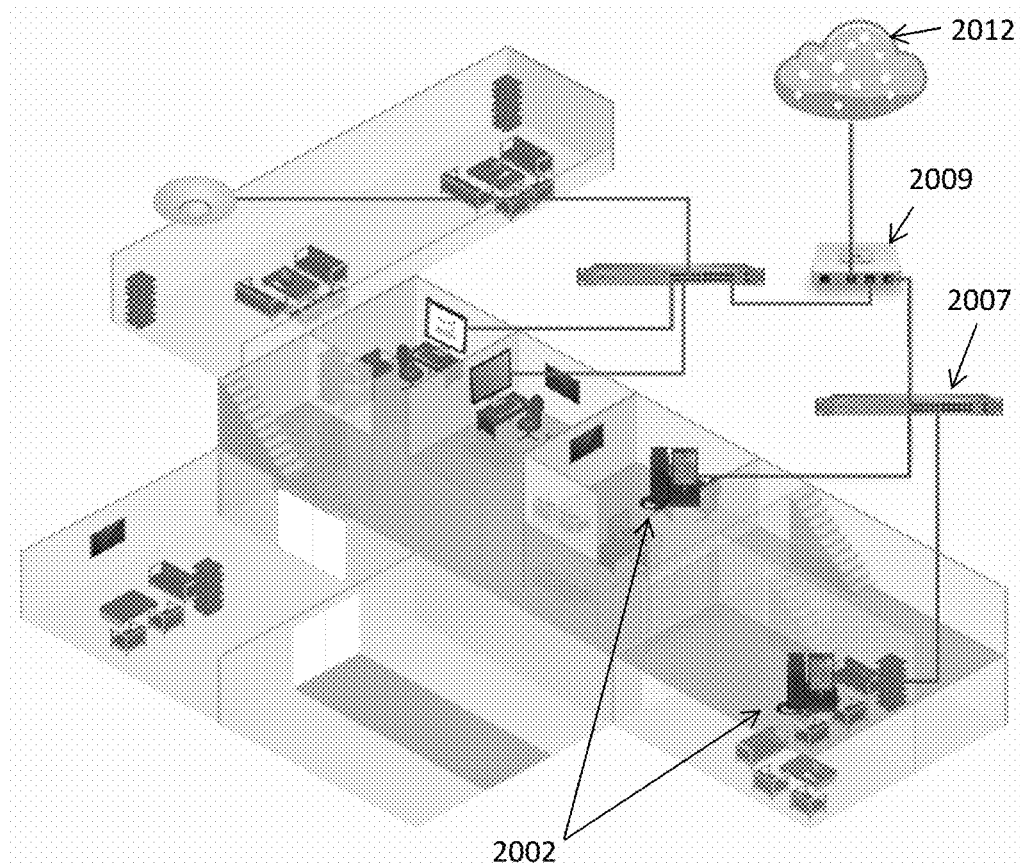
FIG. 20A schematically illustrates the connection (and scalability) of the phone apparatuses described herein as part of a network, including connecting the local phone client to a local network so that it may operate with a remote phone server portion through one or more connections to the remove server(s), including cloud servers.
Figure 20B:
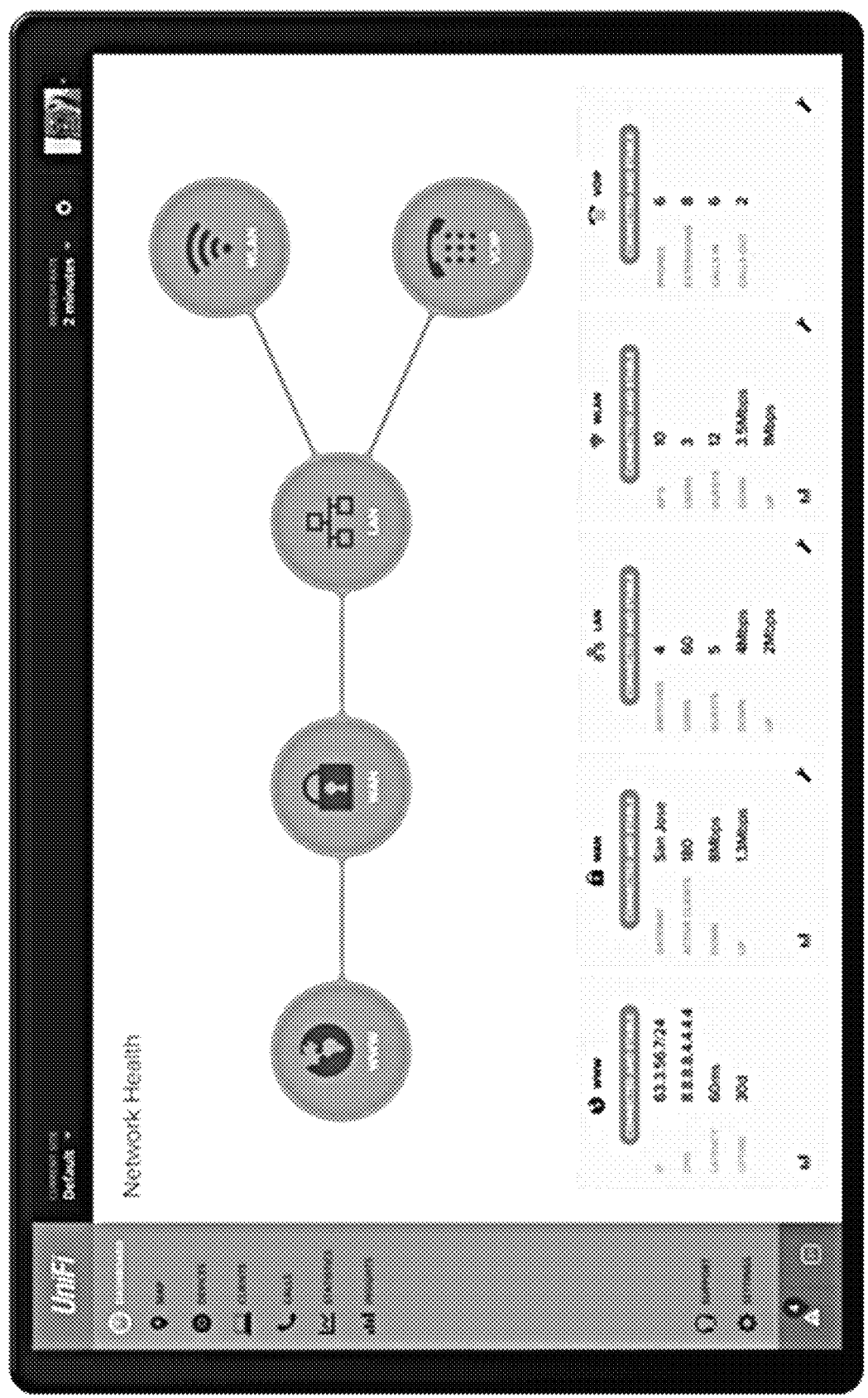
FIG. 20B illustrates one view of a graphical user interface (GUI) for a controller (control gateway) illustrating connection of a local phone client portion of a VOIP phone apparatus that may be managed by the control gateway ("controller" or "gateway controller").
Figure 20C:
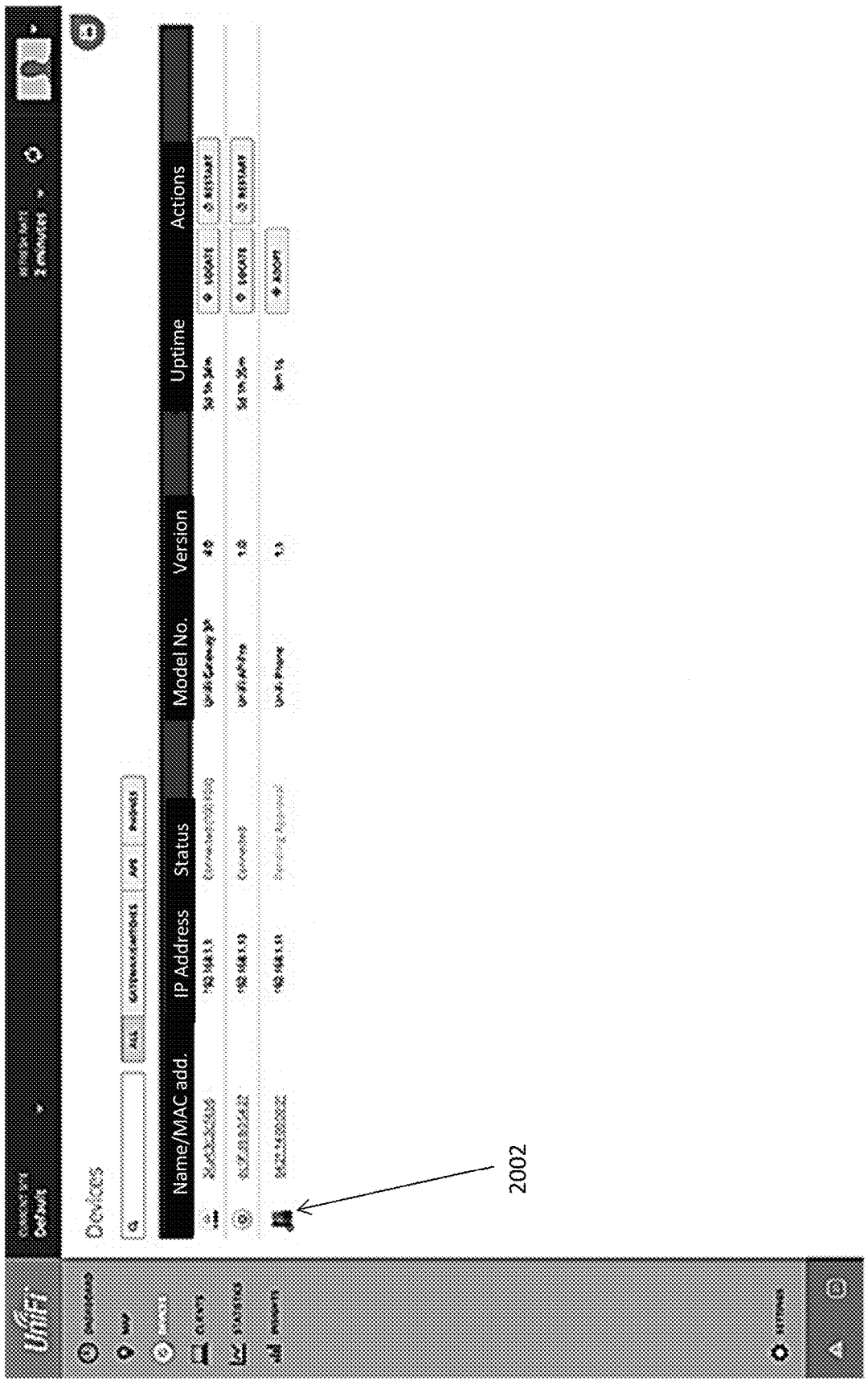
FIG. 20C is an example of a GUI for a control gateway that may be part of (or may be used with) one or more phone systems as described herein.

As mentioned above, in any of the apparatuses (e.g., systems) described herein local phone client portions (devices) may be connected to a local network, installed and recognized, e.g., by a controller gateway that initiates and allows contact with the remote phone server portion. The controller (and the requirement that the phone be validated by a controller gateway) may allow an administrator to form and control a local network including multiple devices including, but not limited to the local phone client portions described herein. This architecture may also provide scalable system management of the local phone client portions (devices), including extension management, mass firmware upgrades, and mass configuration provisioning. The controller gateway may allow an administrator having permission to access the controller gateway to monitor the status of each individual local phone client portion (device) on the local network. For example, the controller gateway may display a list of all of the local phone client portions (devices) in a local network and may indicate status (operational status, error status, etc.) for each device, as well as indicating a connectivity map showing how each local phone client portion (device) is connected to the local network of switches/routers, access points, etc. Any of the phone systems described herein may include a controller gateway. The controller gateway may be hardware, software, or both. FIGS. 20A-20C illustrates one example of this, showing an image of a graphical user interface for a controller gateway displaying three devices, including a local phone client portion 2002. Other devices may include other networked devices (e.g., cameras, laptops, desktop computers, printers, other CPEs, etc.). This GUI may also include information about each device, including the local phone client(s), such as IP address, status (e.g., connected, pending authorization/approval, etc.), Model/make information, software version, uptime, location, etc. In addition, the controller gateway may also allow control actions of these devices, including the local phone client, such as adopt (e.g., add to the local network), restart, locate, etc.

For example, FIG. 20A illustrates the connection of one or more local client portions of any of the phone apparatuses described herein as part of a local network that is regulated by a controller (control gateway) as mentioned above. In general any number of local phone client portions may be added to a local network. This addition may be "plug and play". The phone apparatus may be configured to be automatically provisioned by the network, in some cases through the controller, so that it can connect directly to the network via a wired (e.g., Ethernet connection) or wireless (e.g., Wi-Fi) connection. As shown in FIG. 20A, a plurality of local phone client portions 2012 may be connected (in FIG. 20A using a power-over-Ethernet, or PoE, connection directly to the base housing of the local phone client portion) to the local area network, including (in this example) a switch 2007 and a secure gateway 2009, and though them to a remote (e.g., cloud) server 2012. Thus, no additional separate power supply is necessary. The controller (gateway controller) may manage the switch and gateway, as well as all of the devices (including the local phone client portions 2002).

FIG. 20B illustrates one variation of a GUI for a controller (control gateway) configured to monitor and manage the connection of multiple apparatuses, including one or more local phone client portions, to a local network. In this example, the controller shows an indicator of network health between the remote servers (including web-based cloud servers, "WWW"), and the specific local network that the controller is managing. In FIG. 20B, a plurality of local phone client portions are connected to the local area network (LAN) which is connected to the LAN. The controller may monitor and control the connection of each of a plurality of local phone client portions, including provisioning them on the network. In FIG. 20B, six local phone client portions are connected, having eight extensions active (six incoming calls, two outgoing calls). In this example, all of the phones may be paired with the same phone server portion that is remotely located relative to the local phone client portions (e.g., in the cloud). Each local phone is relatively unsophisticated, and merely makes a connection through its dedicated base unit to the phone server portion, transmitting the requested "out" line, which the remote phone server then connects through the local phone client portion associated with the request. The remote phone server also handles all of the call processing (e.g., hold, conference calling, switching between lines, joining, adding, or removing lines, leaving or receiving voicemails, etc.). The local phone may interface with the user, and may include minimal local-experience controls (optionally, volume, mute, screen brightness, etc.). Alternatively or additionally, these controls may be controlled by the remote phone server portion.

In general, when a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A voice over internet protocol (VOIP) phone system, comprising:
   one or more local phone clients;
   a router or switch configured to connect the one or more local phone clients to a local network; and
   a controller gateway configured to manage the one or more local phone clients, the router or switch, and a gateway of the local network, wherein the controller gateway is configured to:
   validate the one or more local phone clients,
   provision the one or more local phone clients on the local network, and
   route calls from the one or more local phone clients to a remote phone server.

2. The system of claim 1, wherein the controller gateway is configured to monitor a status of the one or more local phone clients.

3. The system of claim 1, wherein the controller gateway is configured to manage a plurality of network devices other than the one or more local phone clients.

4. The system of claim 3, wherein the plurality of network devices comprises one or more of a camera, a laptop, a desktop computer and a printer.

5. The system of claim 1, wherein the controller gateway comprises a user interface that allows a user to manage connection of the one or more local phone clients to the local network.

6. The system of claim 5, wherein the user interface includes information about the one or more local phone clients, including one or more of: an internet protocol (IP) address, a status, make and model, software version, uptime, and location.

7. The system of claim 1, wherein the controller gateway monitors a network health between remote servers.

8. The system of claim 1, wherein the controller gateway is configured to initiate and allow contact with the remote phone server.

9. The system of claim 1, wherein the remote phone server handles call processing including one or more of holding, conference calling, switching between lines, joining, adding lines, removing lines, leaving voicemails, and receiving voicemails.

10. The system of claim 1, wherein the remote phone server handles local-experience controls including one or more of volume, mute and screen brightness of the one or more local phone clients.

11. The system of claim 1, wherein the controller gateway is configured to allow a user to perform one or more of the following: restart the one or more local phone clients, locate the one or more local phone clients, and add a network device to the local network.

12. The system of claim 1, wherein the one or more local phone clients comprises a handset, a touchscreen, and a processor configured to present a user interface comprising user controls.

13. A voice over internet protocol (VOIP) phone system, comprising:
   a local phone client comprising a handset, a touchscreen, and a processor configured to present a user interface comprising user controls;
   a router or switch configured to connect the local phone client to a local network; and
   a controller gateway configured to manage a plurality of network devices including the local phone client, one or more additional local phone clients, a switch and a gateway of the local network, wherein the controller gateway is configured to:
   validate the local phone client,
   provision the local phone client on the local network,
   monitor a status of the local phone client, and
   route calls from the local phone client to a remote phone server.

14. The system of claim 13, wherein the controller gateway is configured to allow a user to control one or more of: restarting, adding to the local network, and provisioning the local phone client and the one or more additional local phone clients.

15. The system of claim 13, wherein the controller gateway is configured to provide a single user interface displaying a status of the plurality of network devices.

16. The system of claim 13, wherein the controller gateway is configured to manage connection of the local phone client and the one or more additional local phone clients to the local network.

17. The system of claim 13, wherein the controller gateway is configured to provide a graphical indication of network health.

18. The system of claim 13, wherein the controller gateway is configured to provide a list of all of the local phone clients connected to the local network.

19. The system of claim 13, wherein the controller gateway is configured to provide an indication of status for each of the local phone clients connected to the local network, wherein the status includes one or more of: operational status and error status.

20. The system of claim 13, wherein the controller gateway is configured to provide a graphical indication of connectivity of the local phone client and the one or more additional local phone clients connect to the local network including one or more of: switches, routers, and access points.

* * * * *